United States Patent
Nishikawa

(10) Patent No.: US 8,395,793 B2
(45) Date of Patent: Mar. 12, 2013

(54) APPARATUSES AND METHODS THAT USE A STAMP FUNCTION TO REGISTER AND EDIT A STAMP

(75) Inventor: Satoshi Nishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1196 days.

(21) Appl. No.: 11/697,416

(22) Filed: Apr. 6, 2007

(65) Prior Publication Data

US 2007/0236710 A1    Oct. 11, 2007

(30) Foreign Application Priority Data

Apr. 7, 2006    (JP) ................. 2006-106624

(51) Int. Cl.
*G06F 3/12* (2006.01)

(52) U.S. Cl. ..... 358/1.15; 358/1.18; 358/400; 358/1.13; 358/1.14; 358/1.1; 715/274

(58) Field of Classification Search ............... 358/1.15, 358/1.1, 1.18, 1.13, 1.14, 400
See application file for complete search history.

(56) References Cited

U.S. PATENT DOCUMENTS

| 6,594,033 | B1 | 7/2003 | Kujirai et al. | |
| 2003/0030846 | A1* | 2/2003 | Mori et al. | 358/400 |
| 2003/0159114 | A1 | 8/2003 | Nishikawa et al. | |
| 2010/0195153 | A1* | 8/2010 | Momose et al. | 358/1.15 |

FOREIGN PATENT DOCUMENTS

| JP | 2000-025276 A | 1/2000 |
| JP | 2001-103271 A | 4/2001 |
| JP | 2001-324898 A | 11/2001 |
| JP | 2003-091526 A | 3/2003 |
| JP | 2003-296070 A | 10/2003 |
| JP | 2004-110354 A | 4/2004 |
| JP | 2006-011938 A | 1/2006 |

OTHER PUBLICATIONS

Nomoto Masaku, Host Computer, Printing Control Method, and Storage Medium, Sep. 16, 2004, JP2004260852.*

* cited by examiner

*Primary Examiner* — Benny Q Tieu
*Assistant Examiner* — Martin Mushambo
(74) *Attorney, Agent, or Firm* — Carter, DeLuca, Farrell & Schmidt LLP

(57) ABSTRACT

In an information processing apparatus that uses a stamp function to register and edit a stamp, the stamp function is used to set a variable character string or image as variable stamp information. When a document is printed in a printer, print data is generated by affixing the preset variable stamp information to the document.

9 Claims, 35 Drawing Sheets

F I G. 2
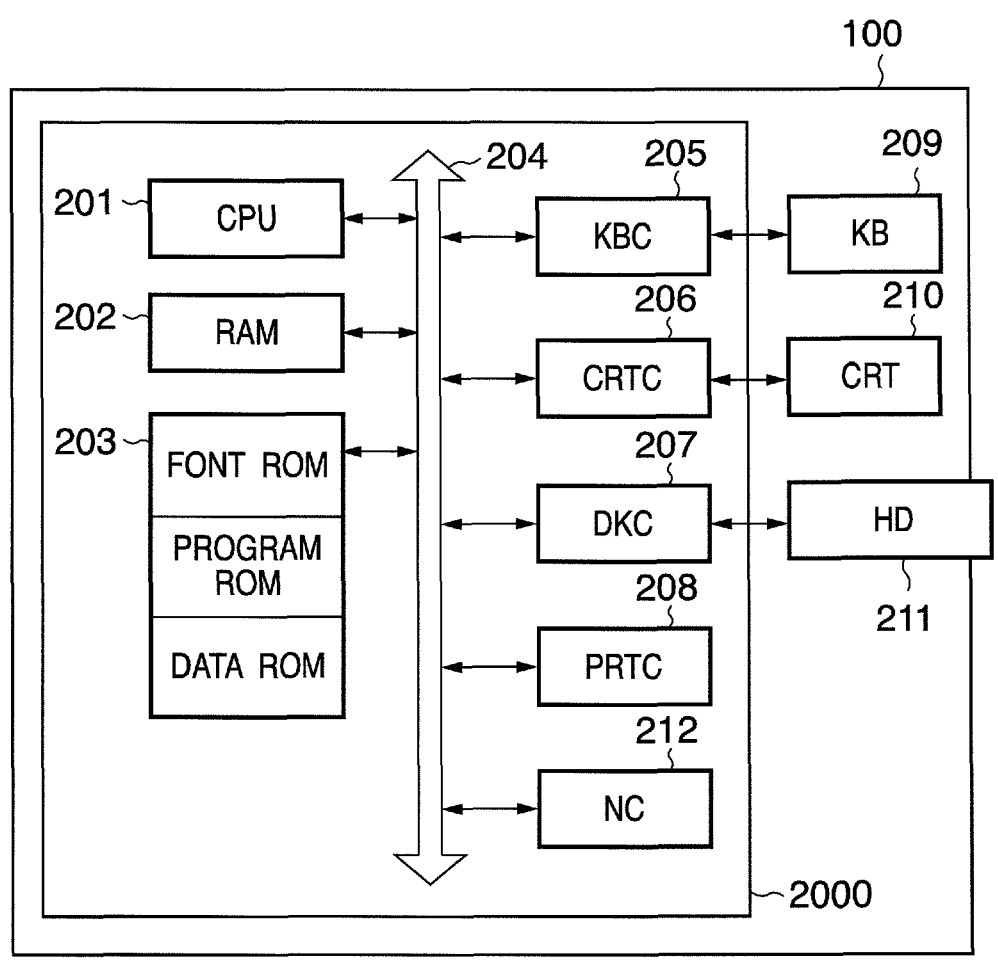

FIG. 4A

| NO | ATTRIBUTE INFORMATION | | REMARKS |
|---|---|---|---|
| 1 | PRINT MODE | SINGLE-SIDED / DOUBLE-SIDED / BOOKBINDING PRINTING | |
| 2 | PAPER SIZE | DOCUMENT SIZE / FIXED SIZE | • Z-FOLD IS DESIGNATED WHEN "A4 + A3", "B4 + B3", OR "LETTER + LEDGER (11 × 17)" IS DESIGNATED<br>• DOCUMENT SIZE OF FIRST CHAPTER / PAGE IS AUTOMATICALLY SELECTED WHEN BOOKBINDING PRINTING OR N-up PRINTING IS DESIGNATED |
| 3 | PAPER ORIENTATION | PORTRAIT / LANDSCAPE | • SELECTABLE ONLY FOR FIXED SIZE |
| 4 | BINDING MARGIN / BINDING ORIENTATION | | • SHIFT / SCALING CAN BE DESIGNATED |
| 5 | N-up PRINTING | NUMBER OF PAGES / LAYOUT ORDER / BOUNDARY / LAYOUT POSITION, etc. | • LAYOUT POSITION : NINE PATTERNS<br>• 1X PRINTING CAN BE DESIGNATED |
| 6 | SCALING | ON / OFF | ON / OFF CAN AUTOMATICALLY BE DESIGNATED WHEN PAPER SIZE IS FIXED OR N-up PRINTING IS SELECTED |
| 7 | WATERMARK | | • WATERMARK CAN BE DESIGNATED INDIVIDUALLY IN LOGICAL OR PHYSICAL PAGES<br>• ALL CHAPTERS / PAGES ARE TARGETED |

FIG. 4B

| | | | |
|---|---|---|---|
| 8 | HEADER / FOOTER | | • HEADER / FOOTER CAN BE DESIGNATED INDIVIDUALLY IN LOGICAL OR PHYSICAL PAGES<br>• ALL CHAPTERS / PAGES ARE TARGETED |
| 9 | PAPER EJECTION MODE | STAPLING / PUNCH HOLE | • STAPLING / PUNCHING ONLY IN SINGLE- / DOUBLE-SIDED PRINTING<br>• STAPLING AT ONE / TWO POSITIONS |
| 10 | BOOKBINDING DETAILS | OPENING DIRECTION / SADDLE STITCH / SCALING DESIGNATION / BINDING MARGIN / SEPARATE BINDING DESIGNATION, etc. | • ONLY IN BOOKBINDING PRINTING |
| 11 | FRONT / BACK COVER | | • PRINTING IS DESIGNATED FOR 1/2 FRONT COVER OR 1/2 BACK COVER<br>• FEED PORT (INCLUDING INSERTER) IS DESIGNATED |
| 12 | INDEX SHEET | | • PRINTING OF CHARACTER STRING ON INDEX PORTION OR ANNOTATION ON INDEX SHEET CAN BE SET<br>• BOOKBINDING PRINTING CANNOT BE DESIGNATED |
| 13 | SLIP SHEET | | • FEED PORT (INCLUDING INSERTER) IS DESIGNATED<br>• DOCUMENT DATA CAN BE PRINTED ON INSERTED SHEET<br>• BOOKBINDING PRINTING CANNOT BE DESIGNATED |
| 14 | CHAPTERING | "NONE" / "PAGE BREAK" / "SHEET CHANGE" | • FIXED TO "SHEET CHANGE" WHEN INDEX SHEET OR SLIP SHEET IS DESIGNATED<br>• "SHEET CHANGE" IN SINGLE-SIDED PRINTING |

F I G. 5

| NO | ATTRIBUTE INFORMATION | | REMARKS |
|---|---|---|---|
| 1 | PAPER SIZE | DOCUMENT SIZE / FIXED SIZE | • "SHEET CHANGE" IS AUTOMATICALLY DESIGNATED WHEN FIXED SIZE IS SELECTED<br>• WHEN A PLURALITY OF SHEETS ARE SELECTED BY BOOK, PAPER SIZE CAN BE CHANGED TO ONLY DESIGNATED PAPER. PAPER SIZE CAN BE CHANGED EVEN WITH DESIGNATION COMPLYING WITH BOOK |
| 2 | PAPER ORIENTATION | PORTRAIT / LANDSCAPE | • SELECTABLE ONLY FOR FIXED SIZE |
| 3 | N-up PRINTING DESIGNATION | NUMBER OF PAGES / LAYOUT ORDER / BOUNDARY / LAYOUT POSITION, etc. | • LAYOUT POSITION : NINE PATTERNS<br>• 1X PRINTING CAN BE DESIGNATED |
| 4 | SCALING | ON / OFF | • ON / OFF CAN AUTOMATICALLY BE DESIGNATED WHEN PAPER SIZE IS FIXED OR N-up PRINTING IS SELECTED |
| 5 | WATERMARK | PRINT / NON-PRINT | • DESIGNATION OF WHETHER TO PRINT ALL WATERMARKS DESIGNATED BY BOOK |
| 6 | HEADER / FOOTER | PRINT / NON-PRINT | • DESIGNATION OF WHETHER TO PRINT ALL HEADERS / FOOTERS DESIGNATED BY BOOK |
| 7 | PAPER EJECTION MODE | STAPLING | • STAPLING CAN BE SET TO "OFF" WHEN STAPLING IS DESIGNATED BY BOOK. DEFAULT VALUE IS "ON" |

FIG. 6

| NO | ATTRIBUTE INFORMATION | | REMARKS |
|---|---|---|---|
| 1 | PAGE ROTATION DESIGNATION | | • 0° / 90° / 180° / 270° CAN BE DESIGNATED |
| 2 | WATERMARK | PRINT / NON-PRINT | • DESIGNATION OF WHETHER TO PRINT ALL WATERMARKS DESIGNATED BY BOOK |
| 3 | HEADER / FOOTER | PRINT / NON-PRINT | • DESIGNATION OF WHETHER TO PRINT ALL HEADERS / FOOTERS DESIGNATED BY BOOK |
| 4 | ZOOM | 50%–200% | • DESIGNATION OF RELATIVE SCALING FACTOR WHEN SIZE THAT FITS VIRTUAL LOGICAL PAGE AREA IS 100% |
| 5 | LAYOUT POSITION | | • NINE FIXED PATTERNS AND ARBITRARY POSITION CAN BE DESIGNATED |
| 6 | ANNOTATION | | |
| 7 | VARIABLE ITEM | | |
| 8 | PAGE SEGMENTATION | | |

FIG. 15
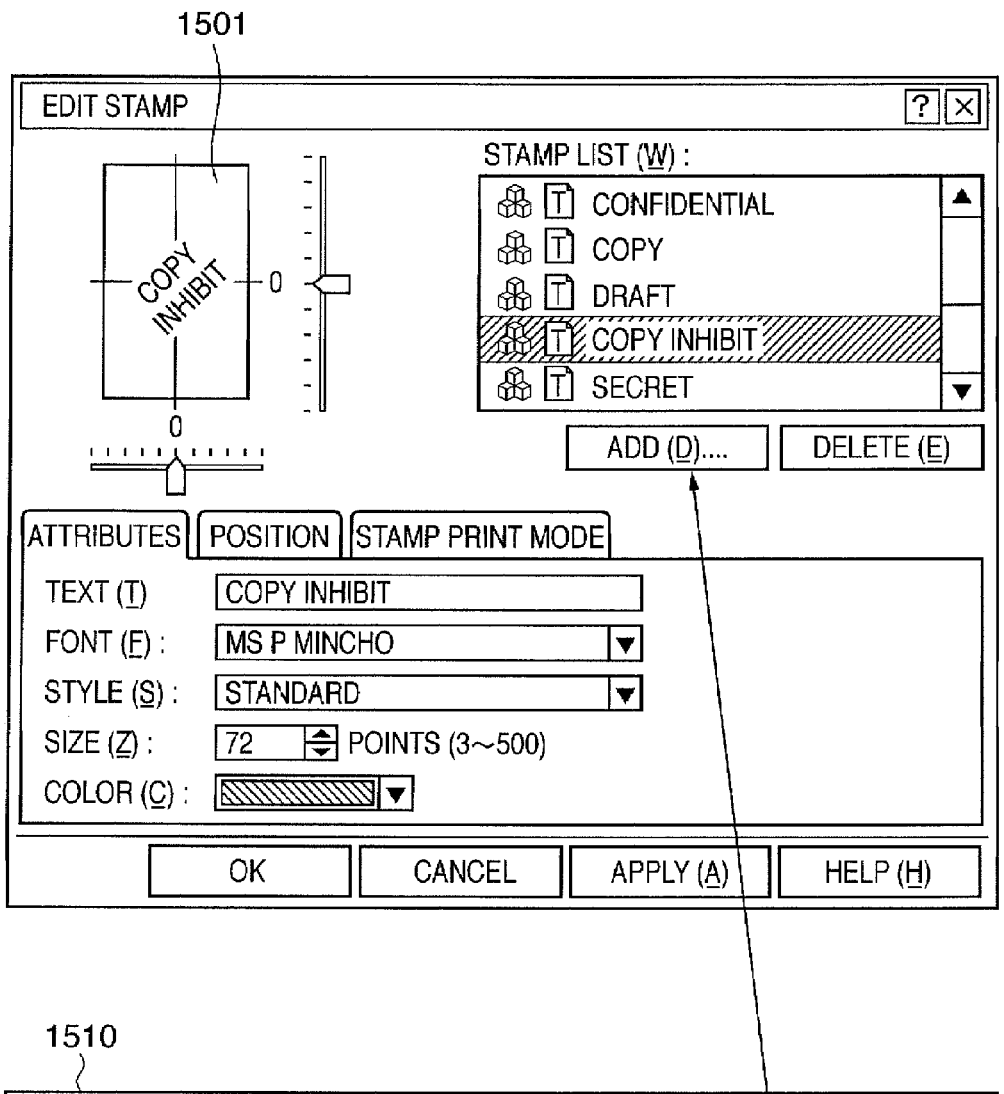
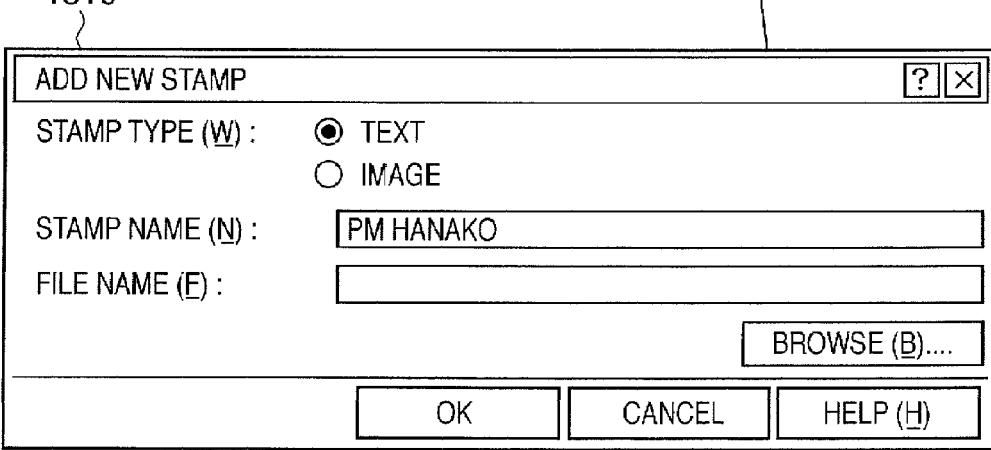

F I G. 22

| |
|---|
| (1) STAMP NAME DESIGNATION BOX<br>    NAME OF VARIABLE STAMP IS SET<br>    NAME IS UNIQUE |
| (2) CHECKBOXES FOR SELECTING VARIABLE STAMP TYPE<br>    TYPE OF VARIABLE STAMP IS SELECTED<br>    TEXT : TEXT STAMP<br>    IMAGE : IMAGE STAMP |
| (3) LIST BOX FOR SELECTING DATABASE FIELD<br>    VARIABLE FIELD USED FOR STAMP IS SELECTED<br>    LISTED FIELD NAMES ARE COLUMN NAMES IN CURRENTLY CONNECTED DATABASE<br>    ※ ONLY ONE FIELD CAN BE SELECTED |
| (5) PREVIEW<br>    DATABASE DATA THAT IS SET AS STAMP IS PREVIEWED |
| (6) RECORD SHIFT BUTTON<br>    BUTTON FOR SHIFTING RECORD<br>    PREVIEW CONTENT CHANGES ACCORDING TO RECORD NUMBER |

FIG. 27A

| ATTRIBUTES | POSITION | STAMP PRINT MODE |

⇔ X (X):  -17  (-50~50)
↕ Y (Y):   -9  (-50~50)

MOVE TO CENTER (M)

FIG. 27B

| ATTRIBUTES | POSITION | STAMP PRINT MODE |

TEXT (T)     PM TARO
FONT (F):    MS MINCHO ▼
STYLE (S):   STANDARD ▼
SIZE (Z):    72   POINTS (3~500)
COLOR (C):   ▓▓▓▓ ▼

FIG. 27C

| ATTRIBUTES | POSITION | STAMP PRINT MODE |

FILE NAME (F):  C:¥Program Files¥Ganon¥iW PM¥Program¥Watermark¥sample4.bmp

BROWSE (B)....

SCALING SETTING (S):  ● SAME SIZE
                      ○ ZOOM   50  % (50~200)
                      ○ ADJUST TO OUTPUT PAPER SIZE

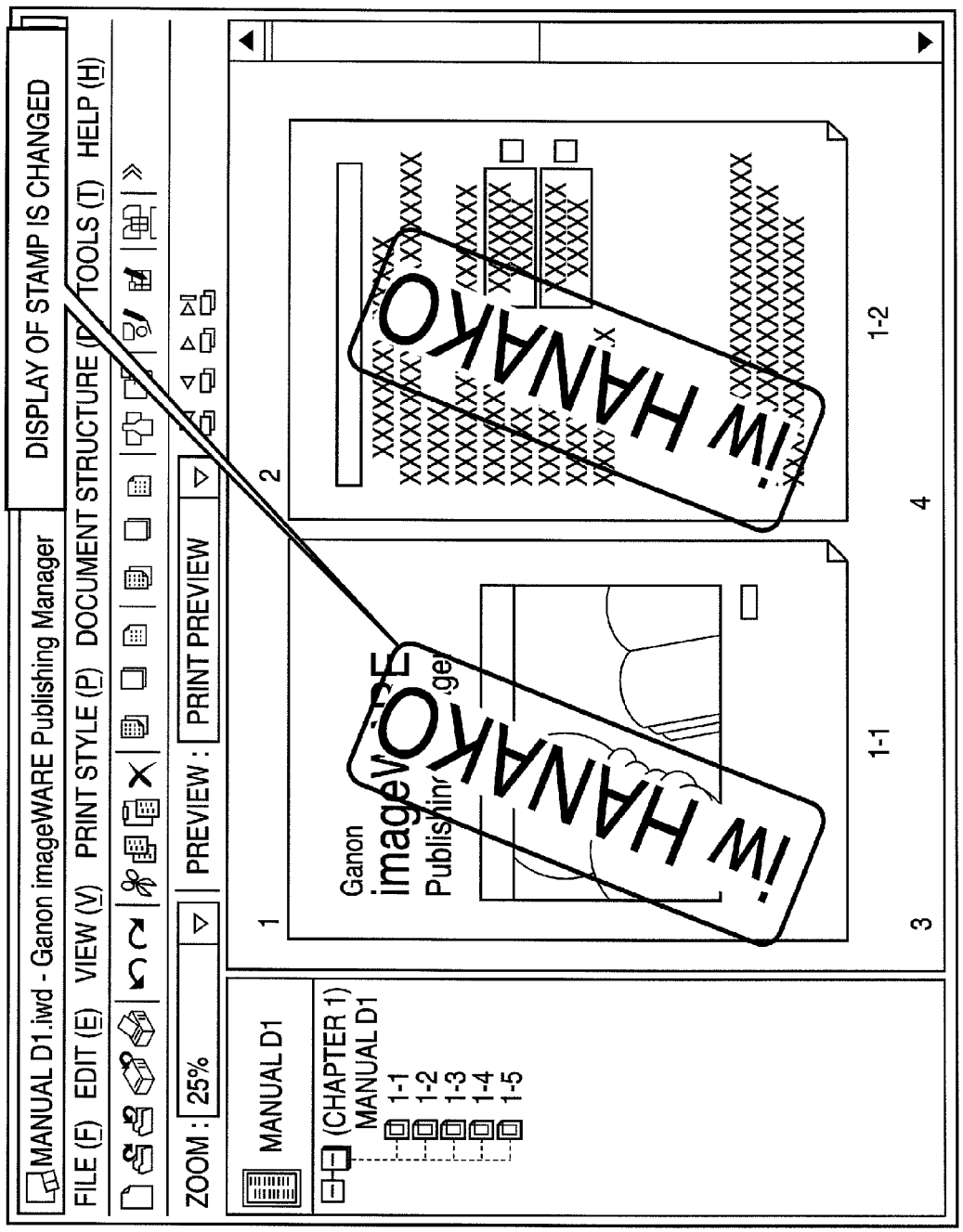
F I G. 30

APPARATUSES AND METHODS THAT USE A STAMP FUNCTION TO REGISTER AND EDIT A STAMP

BACKGROUND OF THE INVENTION

1. Field of the Invention

The present invention relates to information processing apparatuses that use a stamp function to register and edit a stamp, and to processing methods thereof.

2. Description of the Related Art

The current art includes three techniques have been invented as mechanisms for affixing additional information, such as a stamp, to document data and for printing the document data.

A first technique is to affix a stamp to document data in the process of generating a series of print data in a printer driver. In an information processing apparatus, before generating print data to be sent to a printer, data is temporarily stored in a data format (i.e., intermediate code) different from the format of the print data to be eventually sent to the printer. The print data to be eventually sent to the printer is then generated from the data temporarily stored in the intermediate code format.

This print system is provided with a function of affixing characters of an arbitrary size, font, and angle, such as "Confidential" or "No Copying", to document pages or print pages of the data in the intermediate code format corresponding to the entire document or some of its pages. This function will hereafter be referred to as a "stamp function." For example, see Japanese Patent Laid-Open No. 2000-025276.

A second technique is to affix a stamp by using an integrated application that converts the format of a document created by a certain application, stores it as a new document, and displays the stored document on a preview screen. Since this integrated application manages the document in a layered structure composed of a book, chapters, and pages, the stamp may be affixed in each layer. In addition, the ability to perform operations while checking the preview of the document provides an advantage of good operability. For example, see Japanese Patent Laid-Open No. 2003-091526.

A third technique is to affix variable information to document data in an application print system by using replacement printing with variable data (variable), i.e., what is called variable printing. For example, see Japanese Patent Laid-Open No. 2003-296070.

The above-described first technique only allows the use of some character strings prepared through a user interface of the printer driver and of registered character strings. Therefore, it has a disadvantage that a character string needs to be registered in advance each time if the use of a plurality of arbitrary character strings, such as personal names is desired, and this takes effort.

In addition, when a registered stamp is affixed to perform printing, operations of selecting the stamp and performing printing must be performed. This poses a problem that printing with the stamp multiple times requires repetition of these operations, and this takes much effort and time.

The above-described second technique allows checking the state of the affixed stamp by looking at the preview, but the technique only allows the use of some character strings prepared through a user interface of the integrated application and of registered character strings. Therefore, it has a disadvantage that a character string needs to be registered in advance each time if the use of a plurality of arbitrary character strings, such as personal names is desired, and this takes effort.

In addition, when a registered stamp is affixed to perform printing, operations of selecting the stamp and performing printing must be performed. This poses a problem that printing with the stamp multiple times requires repetition of these operations, and this takes much effort and time.

If similar operations are to be performed with the variable function as in the above-described third technique, the desired position, angle, and size of the character string need to be defined for all pages as settings for the text field. Any correction also needs to be made to all pages. Thus, there is a problem of operability.

SUMMARY OF THE INVENTION

The present invention uses a stamp function to register a variable character string or image in a database as variable stamp information.

According to an aspect of the present invention, a method in an information processing apparatus that has a stamp function to register and edit a stamp, the method including setting, as a source from which variable stamp information is obtained, a variable information file defining variable data for a plurality of records, selecting variable data defined in the variable information file for use as the variable stamp information and registering the variable data as the variable stamp information in a stamp list used for the stamp function, performing a selection of the variable stamp information to be affixed to a document from the registered variable stamp information, and generating output data by affixing the selected variable stamp information to the document.

Further features and aspects of the present invention will become apparent from the following detailed description of the exemplary embodiments with reference to the attached drawings.

BRIEF DESCRIPTION OF THE DRAWINGS

FIG. 2 is a block diagram of a computer implementing the document processing system.

FIGS. 4A and 4B are diagrams illustrating a list of book attributes.

FIG. 5 is a diagram illustrating a list of chapter attributes.

FIG. 6 is a diagram illustrating a list of page attributes.

FIG. 15 is a diagram illustrating an exemplary stamp editing UI screen.

FIG. 22 is a diagram illustrating the details of controls illustrated in FIG. 21.

FIGS. 27A to 27C are diagrams illustrating an example in which the attributes, position, and print mode of a stamp are set in a stamp editing dialog.

FIG. 30 is a diagram illustrating that the next record is displayed by record shifting.

DESCRIPTION OF THE EMBODIMENTS

The accompanying drawings, which are incorporated in and constitute a part of the specification, illustrate exemplary embodiments, features, and aspects of the invention and, together with the description, serve to explain the principles of the invention.

<System Overview>

First, a document processing system for an information processing apparatus according to an exemplary embodiment of the present invention will be described below with reference to FIGS. 1 to 12. The document processing system includes an electronic document writer that converts a data file created by a general application into an electronic document file, and a bookbinding application that provides a function of editing the electronic document file. The document processing system allows generation and editing of a document compiled from the created data to improve its operability for efficient document editing.

<System Configuration and Operations>

Figure 1:
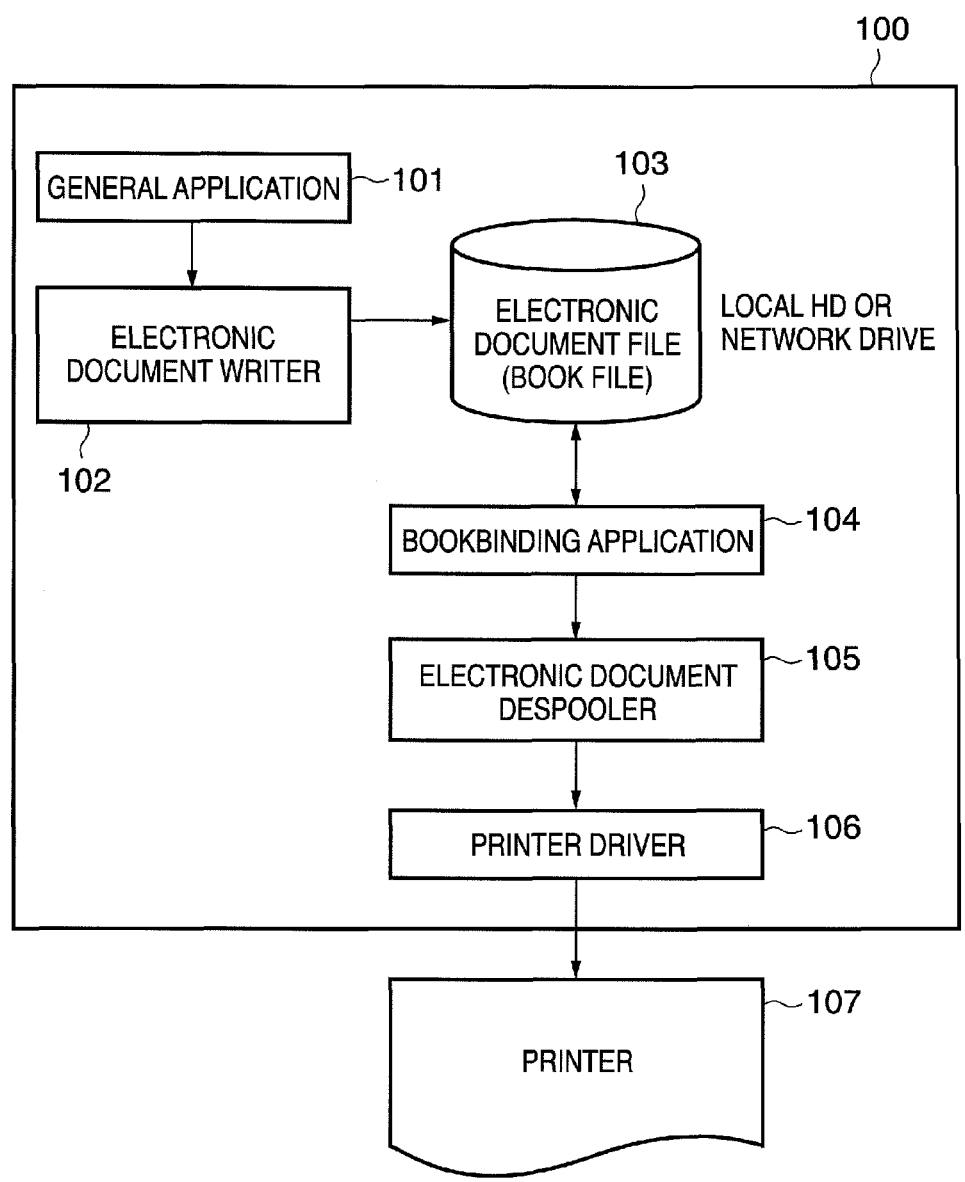
FIG. 1 is a block diagram of a standalone document processing system.

FIG. 1 is a diagram illustrating the software architecture of the document processing system according to an embodiment of the present invention. The document processing system is implemented by a digital computer 100 (also referred to as a host computer). A general application 101 is an application program that provides functions such as word processing, spreadsheet, photo retouch, draw or paint, presentation, or text editing, and the general application 101 has a printing capability for an OS. In printing of application data, such as created document data or image data, such applications use a predetermined interface (generally called a GDI) provided by the operating system (OS). That is, to print created data, the application 101 sends a predetermined output command (called a GDI function) in an OS-dependent format to an output module of the OS providing the above-mentioned interface. The output module, having received the output command, converts the output command into a format processable by an output device, such as a printer, and outputs the converted command (called a DDI function).

Since the format processable by the output device depends on factors, such as the type, manufacturer, and model of the device, a device driver is provided for each device, and the OS converts the command by using that device driver. The OS then generates print data and composes the print data by a JL (Job Language) to generate a print job.

An electronic document writer 102 is a software module provided for implementing the document processing system of the present embodiment. The electronic document writer 102 is not intended for a particular output device, but converts an output command into a format processable by a bookbinding application 104 and a printer driver 106, which are described below.

The format obtained after the conversion by the electronic document writer 102 (hereinafter referred to as an electronic document format) may be any format capable of expressing each document page in detail. Among practical standard formats, exemplary electronic document formats that may be adopted include Portable Document Format (PDF) and Scalable Vector Graphics (SVG).

When the general application 101 uses the electronic document writer 102, the electronic document writer 102 is designated as a device driver used for output, and then printing is performed. However, an electronic document file generated by the electronic document writer 102 does not have a complete format as an electronic document file. Therefore, the electronic document writer 102 is designated as the device driver by the bookbinding application 104. The bookbinding application controls conversion of the application data into an electronic document file. The new incomplete electronic document file generated by the electronic document writer 102 is completed by the bookbinding application 104 as an electronic document file in a format described below.

Hereinafter, the file generated by the electronic document writer 102 will be referred to as an "electronic document file" and the electronic document file given a structure by the bookbinding application 104 will be referred to as a "book file," where distinction between the two file types is necessary for description/example purposes. If the distinction is not necessary, the document file created by the application, electronic document file and the book file will be referred to as document files (or document data).

In this manner, the electronic document writer 102 is designated as the device driver to allow the general application 101 to print data. The application data is converted into an electronic document format made up of pages (hereafter referred to as logical pages or document pages) defined by the application 101, and stored as an electronic document file 103 in a storage medium, such as a hard disk. The hard disk may be a local drive provided in the computer implementing the document processing system of present embodiment or, if the system is connected to a network, may be a drive provided on the network.

The bookbinding application 104 reads the electronic document file (or book file) 103 and provides a user with functions for editing the file. However, the bookbinding application 104 does not provide functions of editing the content of each page but provides functions of editing the chapter or book structure (to be described later) whose minimum units are pages.

When the book file 103 edited by the bookbinding application 104 is printed, an electronic document despooler 105 is activated by the bookbinding application 104. The electronic document despooler 105 is a program module installed onto the computer together with the bookbinding application 104. The electronic document despooler 105 is used for outputting rendering data to the printer driver when a document (book file) used by the bookbinding application 104 is printed. The electronic document despooler 105 reads out a designated book file from the hard disk. Then, to print each page in the form described in the book file, the electronic document despooler 105 generates an output command suitable for the output module of the OS described above and outputs the output command to the output module (not shown).

At this time, the printer driver 106 for a printer 107 used as the output device is designated as a device driver. The above-described output module converts the received output command into a device command and outputs it to the designated printer driver 106 for the printer 107. The printer driver 106 converts the device command into a command, such as a command in a page description language that can be interpreted and executed by the printer 107. The converted command is sent from the printer driver 106 to the printer 107 through a system spooler (not shown), and the printer 107 prints an image corresponding to the command.

FIG. 2 is a block diagram of the hardware of the computer 100. In FIG. 2, a CPU 201 executes programs and implements the software architecture in FIG. 1 and steps in flowcharts described below. The programs include the OS, general application, and bookbinding application 103 stored in program ROM in a ROM 203 or loaded into a RAM 202 from a hard disk 211. The RAM 202 functions as the main memory and as a work area for the CPU 201. A keyboard controller (KBC) 205 controls inputs from a keyboard 209 or a pointing device (not shown). A CRT controller (CRTC) 206 controls display on a CRT display 210. A disk controller (DKC) 207 controls accesses to disks, such as the hard disk (HD) 211 or a floppy disk (not shown) containing a boot program, various applications, font data, user files, editing files, etc. A PRTC 208 controls signal transmission to and from the connected printer 107. An NC 212 is connected to a network and performs processing for controlling communications with other apparatuses connected to the network.

<Format of Electronic Document Data>

Before describing the bookbinding application 104 in detail, the data format of the book file will be described. The book file has a three-layered structure analogous to a paper-medium book. First, the top layer is called a "book", which is analogous to one book and defines attributes of the entire book. The following middle layer corresponds to chapters in a book and is also called "chapter." Attributes may be defined for each chapter. The bottom layer is "page", which corresponds to pages defined by an application program. Attributes may be defined for each page. One book may include a plurality of chapters, and one chapter may include a plurality of pages.

Figure 3A:
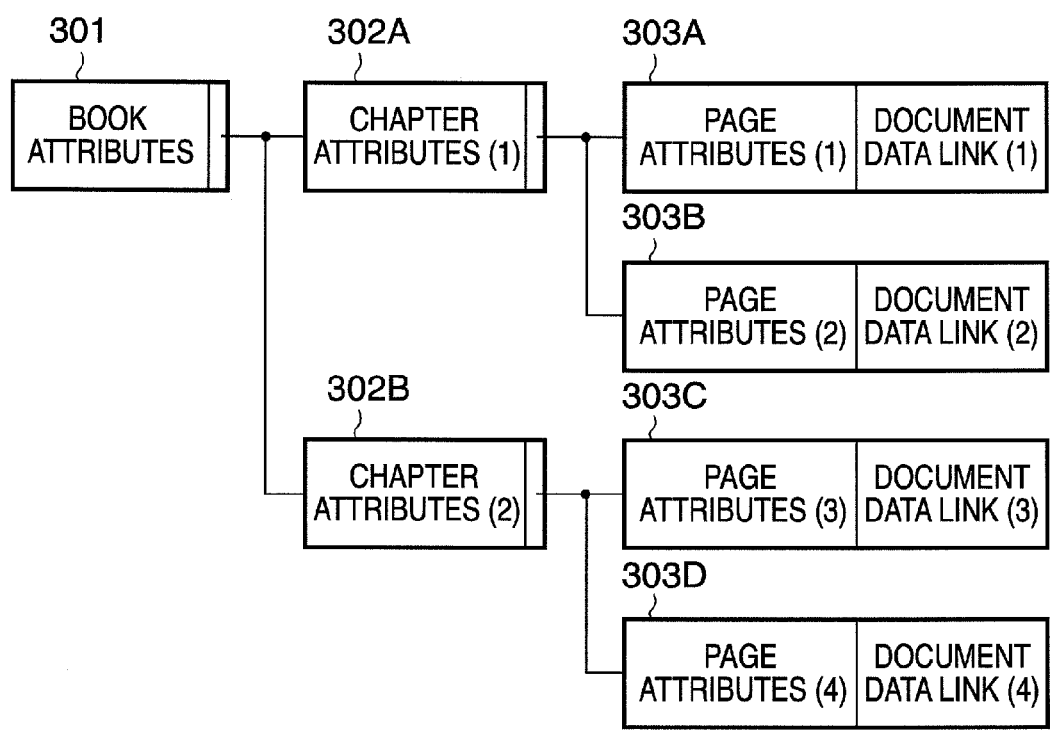
FIGS. 3A and 3B are diagrams illustrating an exemplary book file structure.

FIG. 3A is a diagram schematically illustrating an exemplary format of the book file. As illustrated the book, chapters, and pages in the book file are represented by corresponding nodes. One book file includes one book. Since the book and chapters are concepts for defining a book structure, they include defined attribute values and links to the lower layer as their entity. The pages have data on pages output from an application program as their entity. Therefore, each page includes its attribute values, as well as the entity of a document page (document page data) and a link to the document page data.

A print page to be output onto a medium, such as paper, may include a plurality of document pages. This structure is not represented by links but represented as attributes in the book, chapter, and page layer.

In FIG. 3A, a book 301 defines book attributes and is linked to two chapters 302A and 302B. These links indicate that the chapters 302A and 302B are included in the book 301. The chapter 302A is linked to pages 303A and 303B, indicating that these pages are included in the chapter 302A. The pages 303A and 303B define respective attribute values, and have respective links to document page data (1) and (2) serving as their entity. These links point to respective data (1) and (2) of document page data 304 illustrated in FIG. 3B, indicating that the entity of the pages 303A and 303B is the document page data (1) and (2) respectively. The definition of Chapter 302B and its associated pages 303C and 303D are the same as that for Chapter 302A.

FIGS. 4A and 4B illustrated a list of the book attributes. For an item also definable in a lower layer, the attribute value in the lower layer has priority. Therefore, for an item included only in the book attributes, the value defined in the book attributes is valid throughout the book. However, the value of an item also defined in a lower layer means a default value used if the item is not defined in the lower layer. Each of the items illustrated may not specifically correspond to one item, but may include a plurality of relevant items.

FIG. 5 illustrates a list of the chapter attributes, while FIG. 6 illustrates a list of the page attributes. The relationship between the chapter attributes and the page attributes is the same as that between the book attributes and the lower-layer attributes.

As is illustrated in FIGS. 4 to 6, items unique to the book attributes are print mode, binding margin/orientation, bookbinding details, front/back cover, index sheet, slip sheet, and chaptering. These items are defined throughout the book. As the print mode attribute, three values of single-sided printing, double-sided printing, and bookbinding printing may be designated. The bookbinding printing is a mode of printing which enables bookbinding by folding a separately designated number of sheets in half in a bundle and stitching the bundle. If the bookbinding printing is designated, attributes such as the opening direction and the number of sheets to be bundled may be designated as the bookbinding details attribute.

The front/back cover attribute includes designation of adding sheets serving as front and back covers when an electronic document file to be compiled as a book is printed, and designation of the content to be printed on the added sheets. The index sheet attribute includes designation of inserting tabbed index sheets separately provided in the printer for chaptering, and designation of the content to be printed on the index (tab) portions. This attribute is valid if the printer used is equipped with an inserter having an insert function for inserting sheets provided separately from print sheets into desired places, or if a plurality of paper feed cassettes can be used. This also applies to the slip sheet attribute.

The slip sheet attribute includes designation of inserting sheets fed from the inserter or a paper feed cassette for chaptering, and designation of a feed source of the slip sheets if the inserting of slip sheets is designated. The chaptering attribute includes designation of the use of a new sheet, the use of a new print page, or no particular processing, at a chapter break. In single-sided printing, the use of a new sheet and the use of a new print page have the same meaning. In double-sided printing, consecutive chapters are not printed on one sheet if "the use of a new sheet" is designated, whereas consecutive chapters may be printed on the obverse and reverse of one sheet if "the use of a new print page" is designated.

As to the chapter attributes, no items are unique to the chapters, but all items overlap the book attributes. Therefore, if the definition differs between a chapter attribute and a book attribute, the value defined for the chapter attribute take priority. Items common to only the book attributes and the chapter attributes are paper size, paper orientation, N-up printing designation, scaling, and paper ejection mode. Among these items, the N-up printing designation attribute is an item for designating the number of document pages included in one print page. Layouts that can be designated may include 1×1, 1×2, 2×2, 3×3, and 4×4. The paper ejection mode attribute is an item for designating whether to staple ejected paper, and the validity of this attribute depends on whether the printer used has a stapling function.

Items unique to the page attributes include a page rotation attribute, zoom, layout designation, annotation, and page segmentation. The page rotation attribute is an item for designating the rotation angle when a document page is laid out on a print page. The zoom attribute is an item for designating the scaling factor for a document page. The scaling factor is designated based on the size of a virtual logical page area=100%. The virtual logical page area is an area occupied by one document page when document pages are laid out according to the designation such as N-up. For example, in the case of 1×1, the virtual logical page area is an area corresponding to one print page, whereas in the case of 1×2, the virtual logical page area is an area corresponding to one print page with each of its sides reduced to about 70%.

Attributes common to the book, chapters, and pages are a watermark attribute and a header/footer attribute. A watermark is a separately designated image or character string to be printed over data created by an application. In the present embodiment, the watermark attribute information may include fixed stamp information as well as variable stamp information, which is described below.

A header and footer are watermarks printed in the top margin and bottom margin of each page respectively. Items that can be designated by variables, such as the page number, the date, and the time, are available for the header and footer. The details that can be designated for the watermark attribute and the header/footer attribute are common to the chapters and the pages, but different in the book. The book may set the content of the watermark and the header and footer, and may designate how to print the watermark and the header and footer throughout the book. On the other hand, the chapters and the pages may designate, for each chapter or page, whether to print the watermark and the header and footer set by the book.

<Process of Generating Book File>

The book file includes the above-described structure and content. Now, the process of generating the book file by the bookbinding application 104 and the electronic document writer 102 will be described. The process of generating the book file is implemented as part of operations for editing the book file by the bookbinding application 104.

Figure 3B:
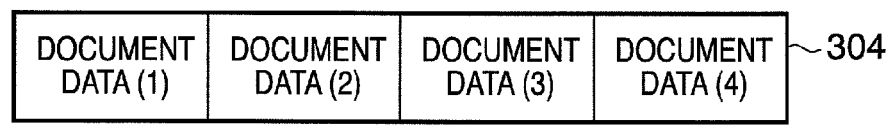
Figure 7:
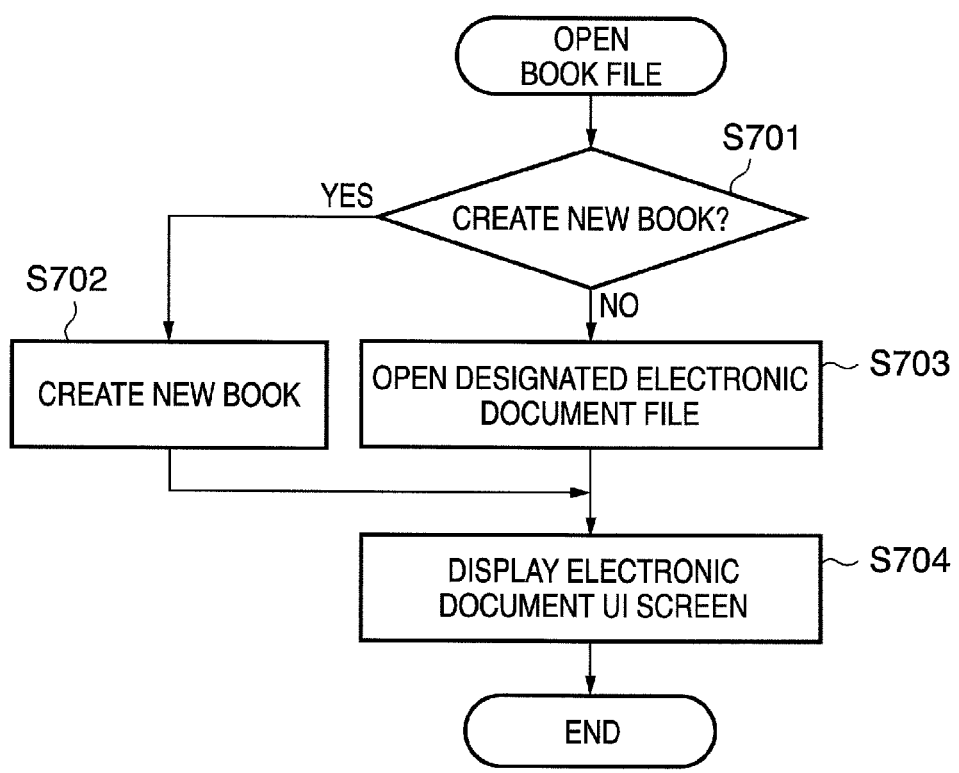
FIG. 7 is a flowchart of the process of opening a book file.
Figure 11:
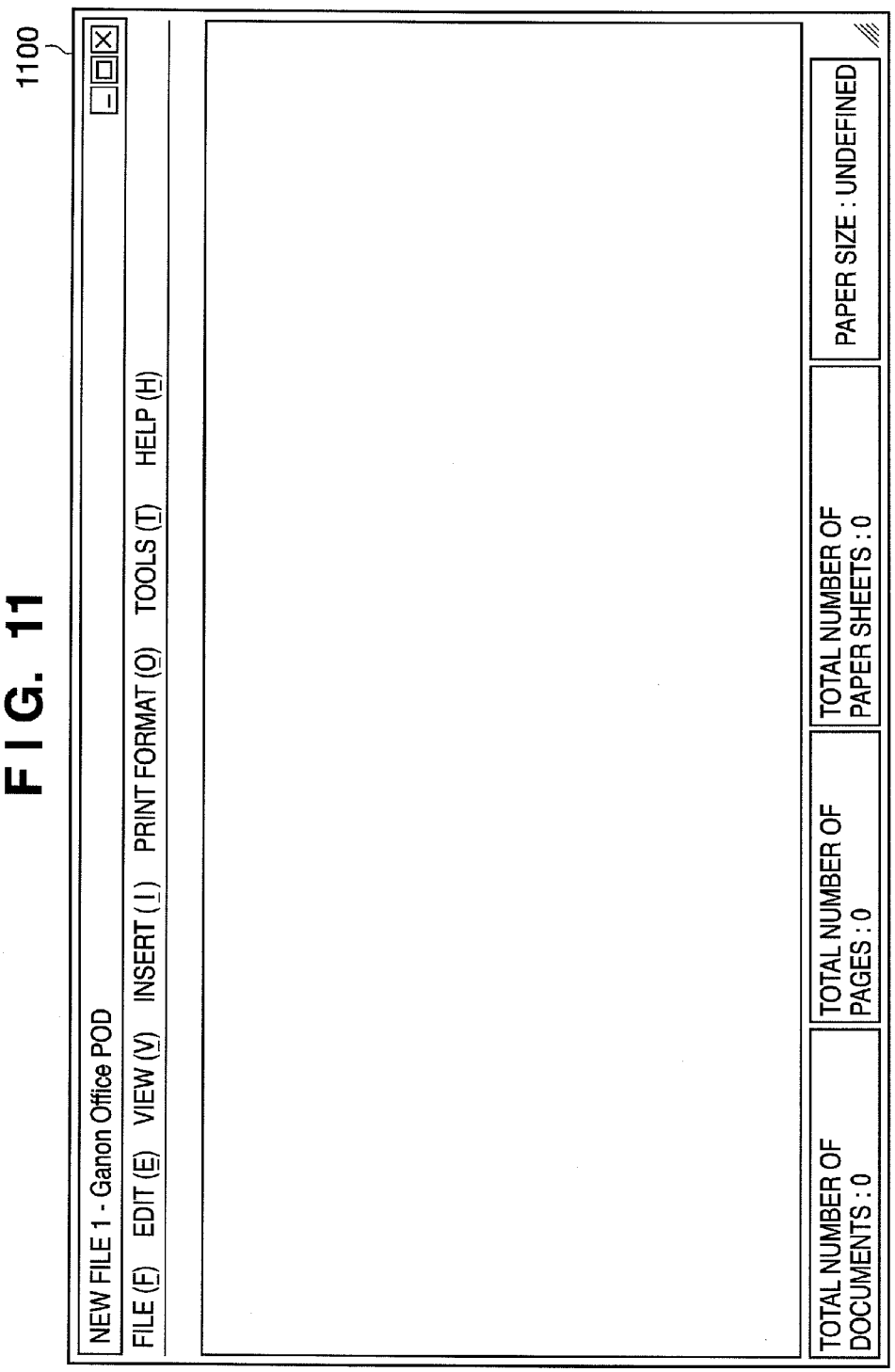
FIG. 11 is a diagram illustrating an exemplary user interface screen displayed when a new book file is opened.

FIG. 7 illustrates the process of opening a book file by the bookbinding application 104. First, in step S701, the bookbinding application 104 determines whether the book file to be opened is a new book file to be created or an existing book file. If a new book file should be created, then in step S702, a new book file containing no chapters is created. In the example of FIGS. 3A and 3B, the new book file to be created will have only the book node 301 without links to chapter nodes. A set of attributes prepared for a new book file is applied to the book attributes. Next, in step S704, a user interface (UI) screen for editing the new book file is displayed. FIG. 11 illustrates an exemplary UI screen displayed when the new book file is created. In the present embodiment, the UI screen 1100 displays nothing because the book file has no substantial content.

Figure 10:
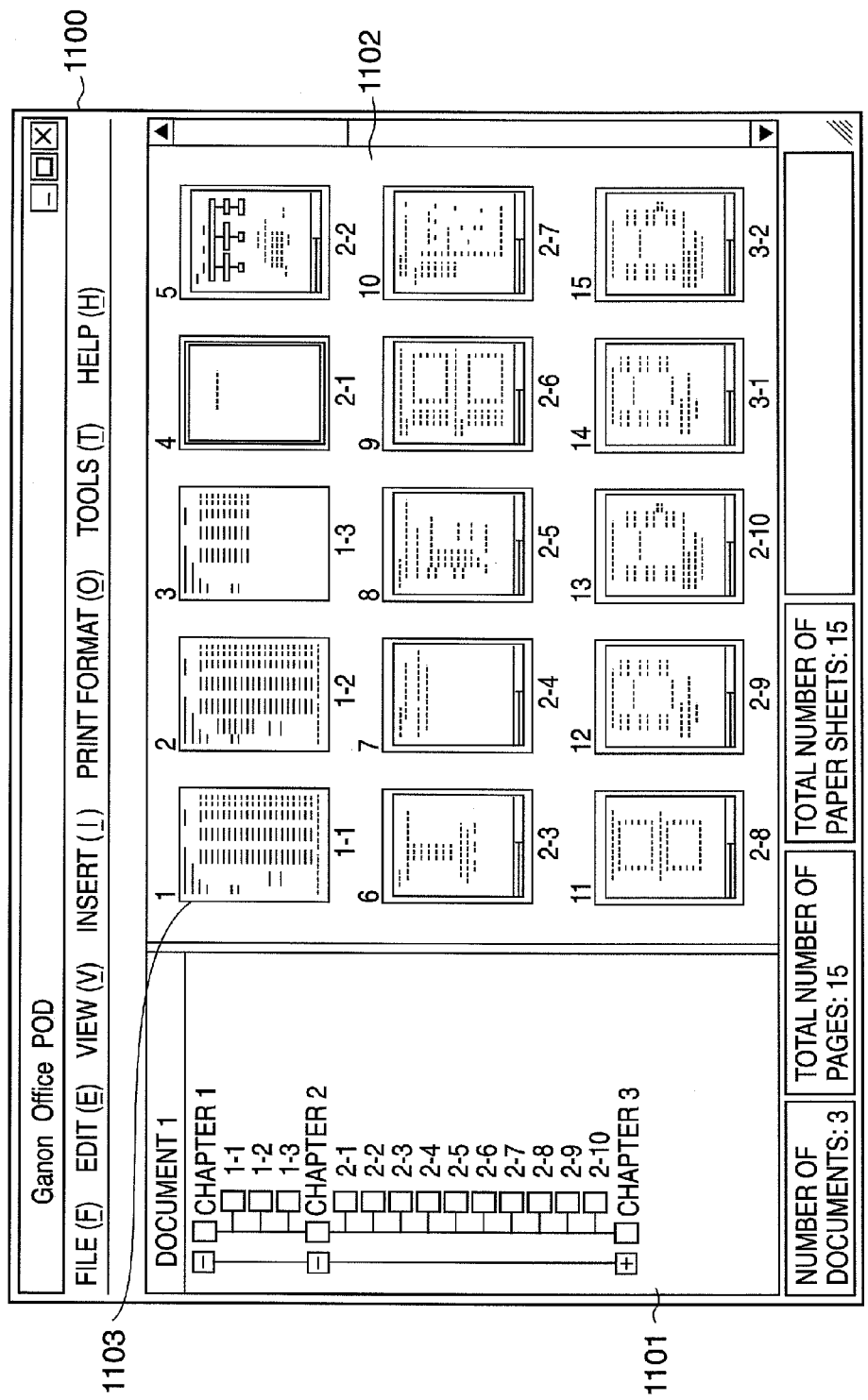
FIG. 10 is a diagram illustrating an exemplary user interface screen displayed when an existing book file is opened.

If the book file is an existing one, then in step S703, the designated book file is opened and a user interface (UI) screen is displayed according to the structure, attributes, and content of the book file. FIG. 10 illustrates an exemplary UI screen displaying the book file designated among existing book files. The UI screen 1100 includes a tree section 1101 displaying the structure of the book, and a preview section 1102 displaying the print state. In the tree section 1101, chapters included in the book and pages included in each chapter are displayed in a tree structure as illustrated in FIG. 3A. The pages displayed in the tree section 1101 are document pages. The content of the print pages 1103 is reduced in size and displayed in the preview section 1102. The display order reflects the structure of the book.

Application data converted by the electronic document writer 102 into an electronic document file may be added as a new chapter to the opened book file. This function will be referred to as an electronic document import function. By performing the electronic document import into the new book file created in the process illustrated in FIG. 7, the book file is given its entity. This function is activated by a drag-and-drop operation of the application data on the screen of FIG. 10.

Figure 8:
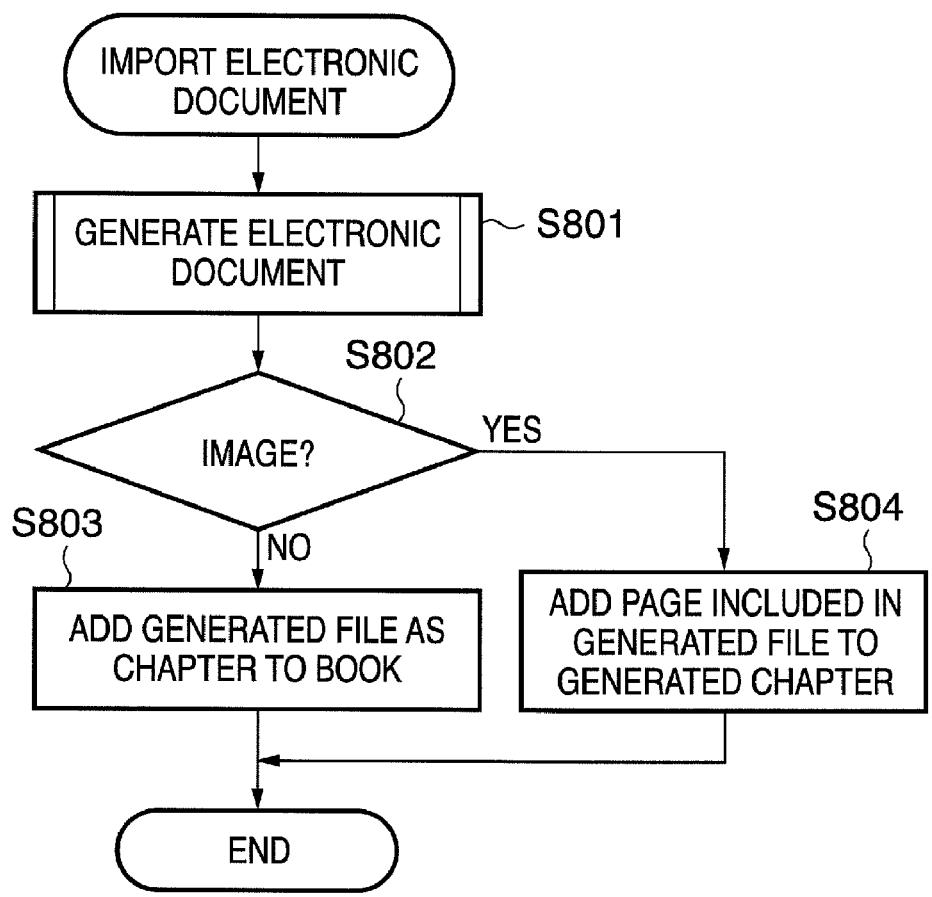
FIG. 8 is a flowchart of the process of importing an electronic document file into a book file.

FIG. 8 illustrates the process of the electronic document import function. First, in step S801, an application program that has created designated application data is started. The application data is converted into electronic document data by designating the electronic document writer 102 as a device driver and outputting the application data for printing. Once the conversion has finished, a determination is made in step S802 whether the converted data is image data. In a Microsoft® Windows environment, this determination is based on the file extension of the application data. For example, it can be determined that the data is a Windows bitmap data if the extension is "bmp", a JPEG-compressed image data if the extension is "jpg", and a TIFF-formatted image data if the extension is "tiff." For these types of image data, the processing in step S801 may be skipped because the electronic document file can be directly generated from the image data without starting the application in step S801.

If the data is not image data, then in step S803, the bookbinding application 104 add the electronic document file generated in step S801 as a new chapter to the book in the currently opened book file. Values of book attributes are copied into chapter attributes overlapping the book attributes, and other chapter attributes are set to predetermined default values.

If the data is image data in step S802, then in step S804, a new chapter is not added as a rule, but a document page included in the electronic document file generated in step S801 is added to a designated chapter. However, if the book file is a newly created file, a new chapter is generated and the page is added thereto as a page belonging to that chapter. Attribute values in a higher layer are applied to page attributes overlapping the attributes in the higher layer. For page attributes defined in the application data and to be inherited by the electronic document file, the attribute values of the application data are applied to the page attributes of the electronic document file. For example, if designation such as N-up is defined in the application data, its attribute value is inherited. In this manner, a new book file is created or a new chapter is added.

Figure 9:
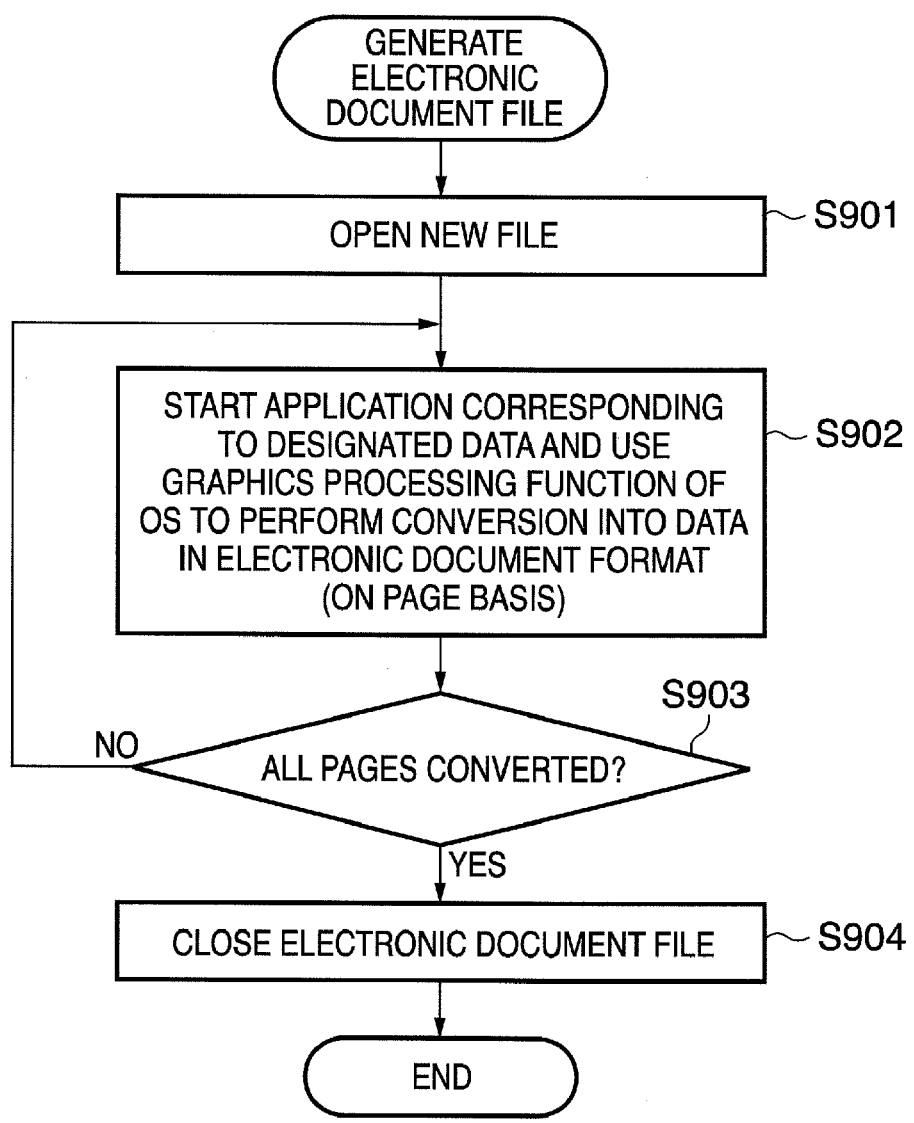
FIG. 9 is a flowchart of the process of converting application data into an electronic document file.

FIG. 9 is a flowchart of the process of generating the electronic document file by the electronic document writer 102 in step S801. First, in step S901, a new electronic document file is created and opened. Next, in step S902, An application corresponding to designated application data is started, and the electronic document writer 102 is used as a device driver to transmit an output command to the output module of the OS. The output module causes the electronic document writer 102 to convert the received output command into data in the electronic document format and output the data. The output destination is the electronic document file opened in step S901. In step S903, it is determined whether the conversion has finished for all designated data. If finished, the electronic document file is closed in step S904. The electronic document file generated by the electronic document writer 102 is a file containing the entity of the document page data illustrated in FIG. 3B.

<Editing of Book File>

As described above, the book file can be generated from the application data. The generated book file may be subjected to the following editing operations for the chapters and pages:
  (1) Add
  (2) Delete
  (3) Copy
  (4) Cut
  (5) Paste
  (6) Move
  (7) Rename chapter
  (8) Reassign page number/name
  (9) Insert front cover
  (10) Insert slip sheet
  (11) Insert index sheet
  (12) Page layout of each document page In addition, an operation of undoing an editing operation performed, and an operation of redoing the undone operation are possible. These editing functions allow editing operations such as integrating a plurality of book files, rearranging chapters and pages within a book file, deleting chapters and pages within a book files changing the layout of document pages, and inserting slip sheets and index sheets. Once these operations have been performed, the operation result is reflected on the attributes illustrated in FIGS. 4 and 5 or on the structure of the book file. For example, a blank page is inserted into a designated place by an operation of adding a new blank page. This blank page is treated as a document page. If the layout of document pages is changed, the details of the change are reflected on attributes such as the print mode, N-up printing, front/back cover, index sheet, slip sheet, and chaptering.

<Output of Book File>

The book file generated and edited as described above is typically printed out. When a user selects a File menu on the UI screen 1100 of the bookbinding application 104 illustrated in FIG. 10 and selects Print on the menu, the data is printed out at a designated output device. At this time, the bookbinding application 104 generates a job ticket from the currently opened book file and passes the job ticket to the electronic document despooler 105. The electronic document despooler 105 converts the job ticket into an output command for the OS, for example a GDI function in Microsoft® Windows, and sends the output command to an output module, for example a GDI. The output module uses the designated printer driver 106 to generate a command suitable for the device and sends the command to the device.

The job ticket is data with a structure whose minimum unit is a document page. The structure of the job ticket defines the layout of the document pages on paper. One job ticket is issued for one job. Therefore, a document node is at the top of the structure and defines attributes of the entire document, for example, double-sided printing/single-sided printing. Below the document node is a paper node including attributes such as the identifier of paper to be used and designation of a paper feed slot of the printer. Below the paper node are nodes of sheets to be printed with that paper.

One sheet corresponds to one sheet of paper. One or more print pages (physical pages) belong to each sheet. One physical page belongs to one sheet in the case of single-sided printing, whereas two physical pages belong to one sheet in the case of double-sided printing. A document page to be laid out on a physical page belongs to the physical page. Attributes of the physical pages include the document page layout.

The electronic document despooler 105 converts this job ticket into the output command for the output module.

<Another System Configuration>

The document processing system of another embodiment has generally been described above. While this is a standalone system, a server-client system implemented by extending the standalone system may also be used to generate and edit the book file with a similar configuration and process. In that case, the book file and the print processing are managed by a server.

Figure 12:
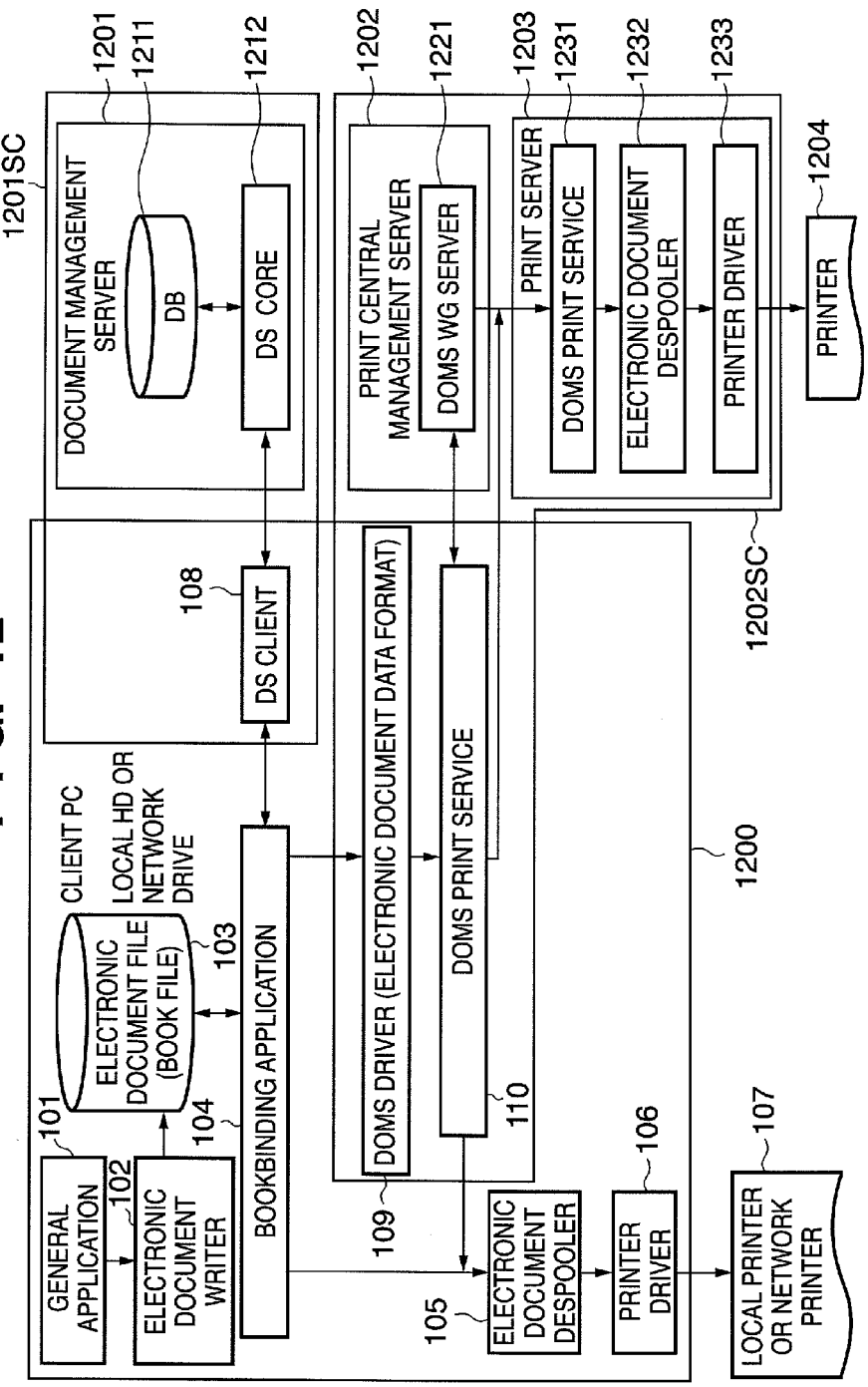
FIG. 12 is a block diagram of a client-server document processing system.

FIG. 12 is a block diagram illustrating the configuration of the server-client document processing system. A client document processing system is implemented by a standalone system with additional client modules including a Document Output Management Service (DOMS) driver 109, a DOMS print service module 110, and a DS (Document Service) client 108. Connected to this client document processing system 1200 are a document management server 1201, a print central management server 1202, and a print server 1203. These servers are typically connected to the client document processing system over a network. If the servers also function as clients, they are connected via interprocess communications that simulate communications over the network.

Although both the document management server 1201 and the print central management server 1202 are connected to the client in the example illustrated in FIG. 12, only one of them exists on the network. For example, if the connected server is the document management server 1201, a document management server-client system 1201SC including the DS client 108 for that server is added to the standalone document management system. If the connected server is the print central management server 1202, a print management server-client system 1202SC including the client module for that server is added to the standalone document management system.

The document management server 1201 is a server that stores the book file generated and edited by the bookbinding application 104. When the book file is managed by the document management server 1201, the book file is stored in a database 1211 of the document management server 1201 instead of or in addition to a local HD of the client PC. Storage and readout of the book file between the bookbinding application 104 and the document management server 1201 are performed via the DS client 108 and a DS core 1212.

The print central management server 1202 is a server that manages printing of the book file stored in the client document processing system 1200 or in the document management server 1201. A print request from the client is transmitted to a DOMS WG server module 1221 of the print central management server 1202 via the DOMS driver 109 and the DOMS print service module 110. To print the book file by the printer of the client, the print central management server 1202 passes the electronic document data to the electronic document despooler 105 via the DOMS print service module 110 of the client. To print the book file by the print server 1203, the print central management server 1202 transmits the electronic document data to a DOMS print service module 1231 of the print server 1203. The print central management server 1202 performs operations, such as a security check, on the qualification of a user who has issued the print request for the stored book file, and storage of a print processing log. Thus, the document processing system may be implemented either as a standalone system or as a client-server system.

<Content of Preview Display>

As described above, the user interface screen 1100 is displayed when the book file is opened by the bookbinding application 104. The tree section 1101 displays a tree representing the structure of the opened book (hereafter referred to as a "focused book"). The preview section 1102 provides three display modes depending on the user's designation. A first mode is called a document view mode, in which document pages are directly displayed. In the document view mode, the content of document pages belonging to the focused book is displayed with their size reduced. The layout is not reflected on the display in the preview section 1102. A second mode is a print view mode. In the print view mode, the document pages are displayed in the preview section 1102 with their layout reflected on the display. A third mode is a simple print view mode. In the simple print view mode, not the content but only the layout of the document pages is reflected on the display in the preview section.

<Print System>

A description will now be provided of control exerted when the book file 103 generated and edited by the bookbinding application 104 of the host computer 100 is printed on a printer 107 with a double-sided printing function. Specifically, a method for reading print settings that designate functions such as bookbinding printing and separate binding, and determining whether to implement the print settings in one job or more than one job depending on the ability of the printer 107 will be described.

Figure 13:
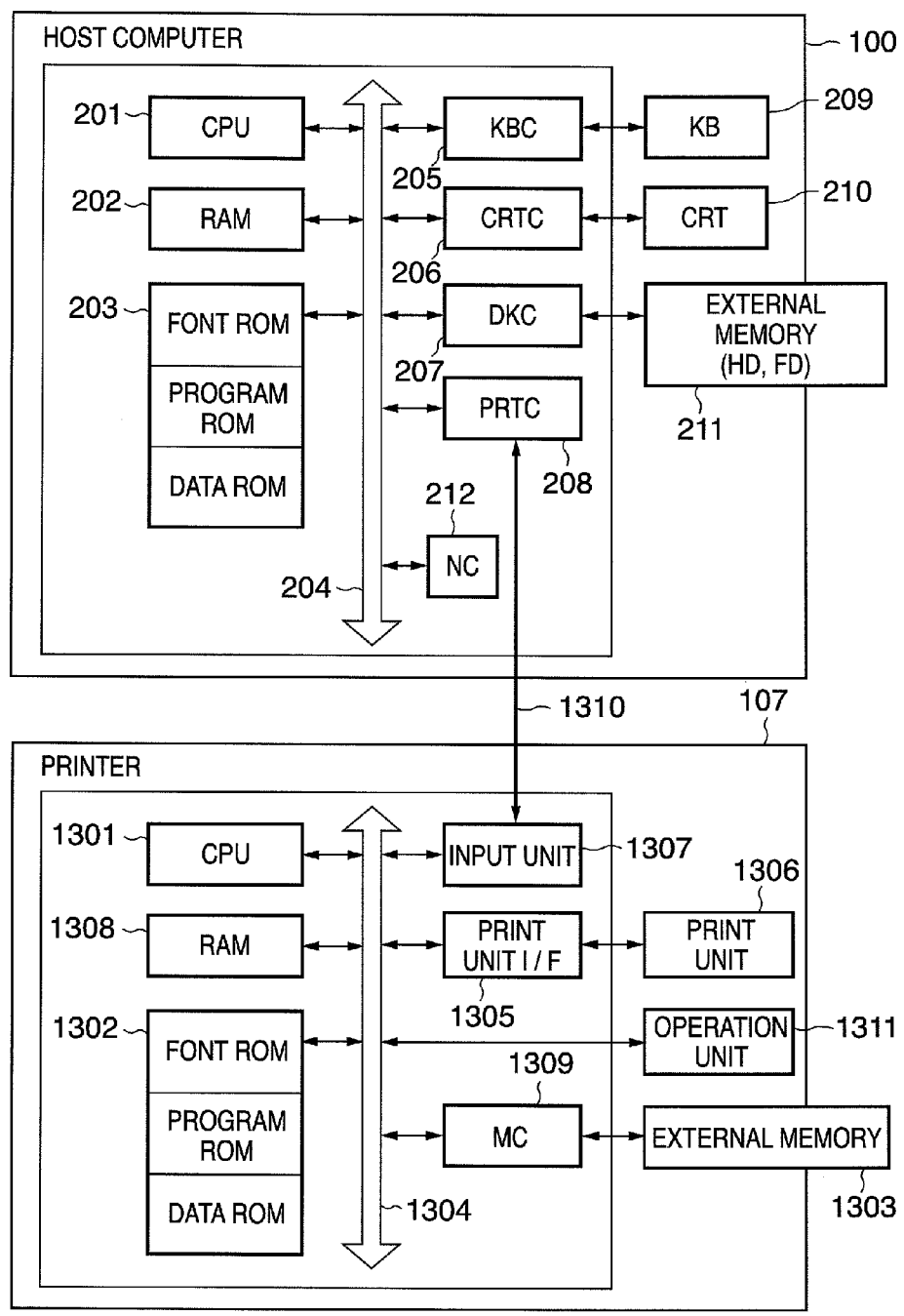
FIG. 13 is a block diagram illustrating the configuration of a print system in an embodiment.

FIG. 13 is a block diagram illustrating the configuration of a print system according to the present embodiment. As illustrated, the print system includes the host computer 100 illustrated in FIG. 2 and the printer 107 with the double-sided printing function.

The configuration of the printer 107 is described below. The present invention is applicable to any system capable of implementing the functions of the present invention, whether it is a single apparatus, a system including a plurality of apparatuses, or a system in which processing is performed by making connections over a network such as a LAN or WAN.

As illustrated in the printer 107, reference numeral 1301 denotes a CPU. Based on a control program, the CPU 1301 outputs an image signal as output information to a print unit (printer engine) 1306 via a print unit I/F 1305 connected to a system bus 1304. The control program is stored in program ROM in a ROM 1302 or in an external memory 1303, such as a hard drive. The program ROM in the ROM 1302 contains the control program, and the font ROM in the ROM 1302 contains font data used in generating the output information. Data ROM in the ROM 1302 contains information used in the host computer 100 if the printer 107 does not have the external memory 1303.

The CPU 1301 communicates with the host computer 100 via an input unit 1307, thereby providing the host computer 100 with information from the printer 107. A RAM 1308 functions as the main memory and a work area for the CPU 1301, and the memory capacity may be increased with optional RAM connected to an extension port (not shown).

The RAM 1308 is also used as an area for loading output information, as well as an area for storing environmental data. Access to the external memory 1303 is controlled by a memory controller (MC) 1309. The external memory 1303 is connected as an option to store data such as font data, an emulation program, and form data. An operation panel 1311 includes operation switches and LED indicators.

The external memory 1303 is not limited to one unit, but may be a plurality of units so that a plurality of external memory units may be connected that contain option cards and programs for interpreting printer control languages of different language systems in addition to the stored fonts. Furthermore, an NVRAM (not shown) may be provided for storing printer mode setting information received from the operation panel 1311.

FIGS. 14 to 33 illustrate the present embodiment's use of stamps and a variable stamp function.

Figure 14:
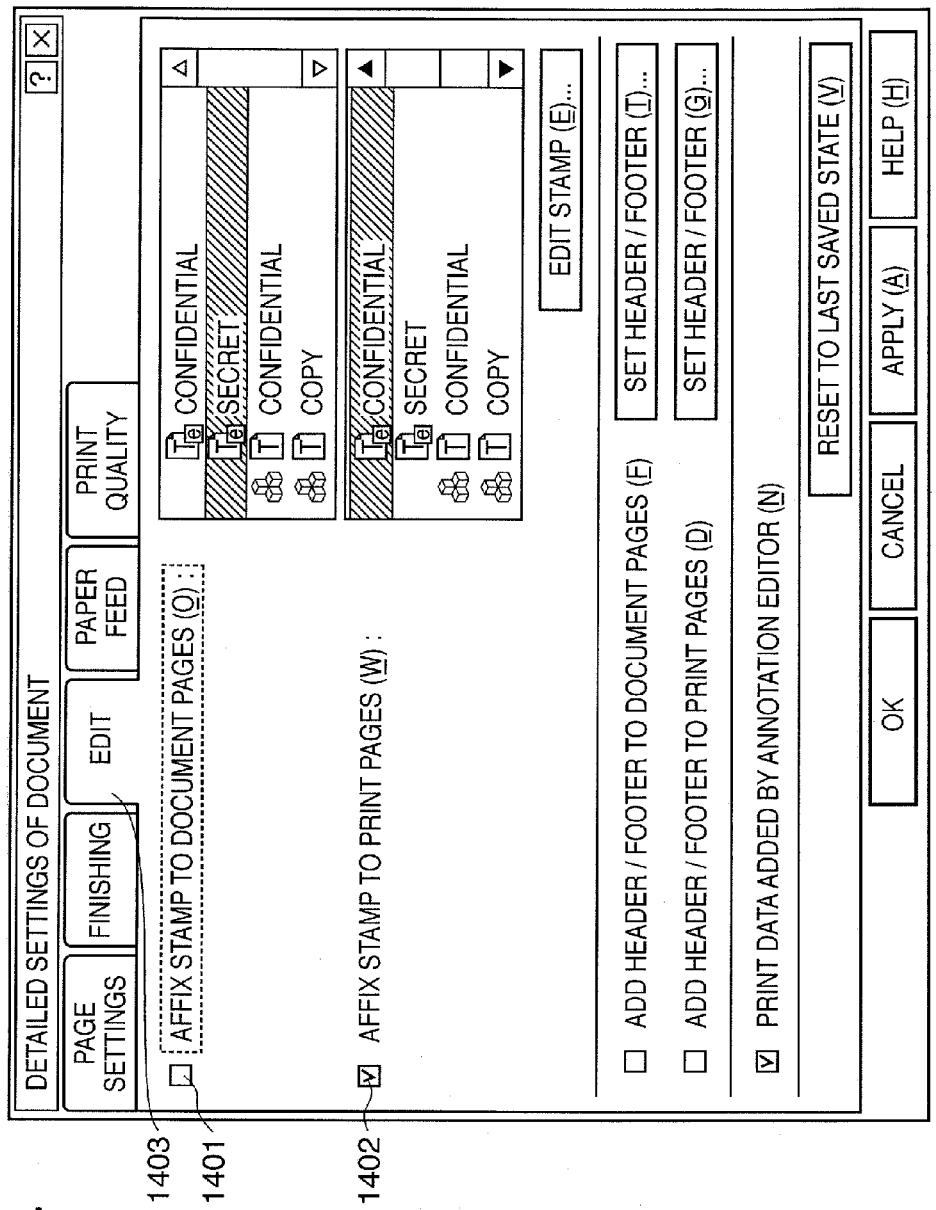
FIG. 14 is a diagram showing a stamp affixing UI screen for a general stamp function.

First, using FIGS. 14 and 15, a general stamp function will be described. The stamp function described in FIGS. 14 and 15 is setting an addition of a fixed character string or a fixed image, and such stamp information may be referred to as fixed stamp information for distinguishing it from variable stamp information. When the use of the stamp function is desired on the UI screen of the bookbinding application illustrated in FIG. 10, Print Format is selected on the menu. Then, a stamp affixing UI screen illustrated in FIG. 14 for making document print settings is opened to select a stamp to be affixed. A determination whether to affix the stamp to document pages or print pages is made using the checkbox 1401 or 1402 illustrated in FIG. 14. Stamps available here are character strings provided in advance or registered stamps.

To register a desired character string as a stamp by the user, Edit Stamp 1403 illustrated in FIG. 14 is selected to display a stamp editing UI screen illustrated in FIG. 15. This UI screen allows changing the font type, size, color, etc. of an existing stamp. Once the position of the stamp is set as illustrated at 1501, the stamp will be put at the same position irrespective of documents.

"Add New Stamp" may be selected to display a stamp adding UI 1510, on which a new stamp may be added. The stamp added here will be listed on the stamp affixing UI screen illustrated in FIG. 14 and made available.

Figure 16:
FIG. 16 is a diagram illustrating print results of using the general stamp affixing function.
Figure 17:
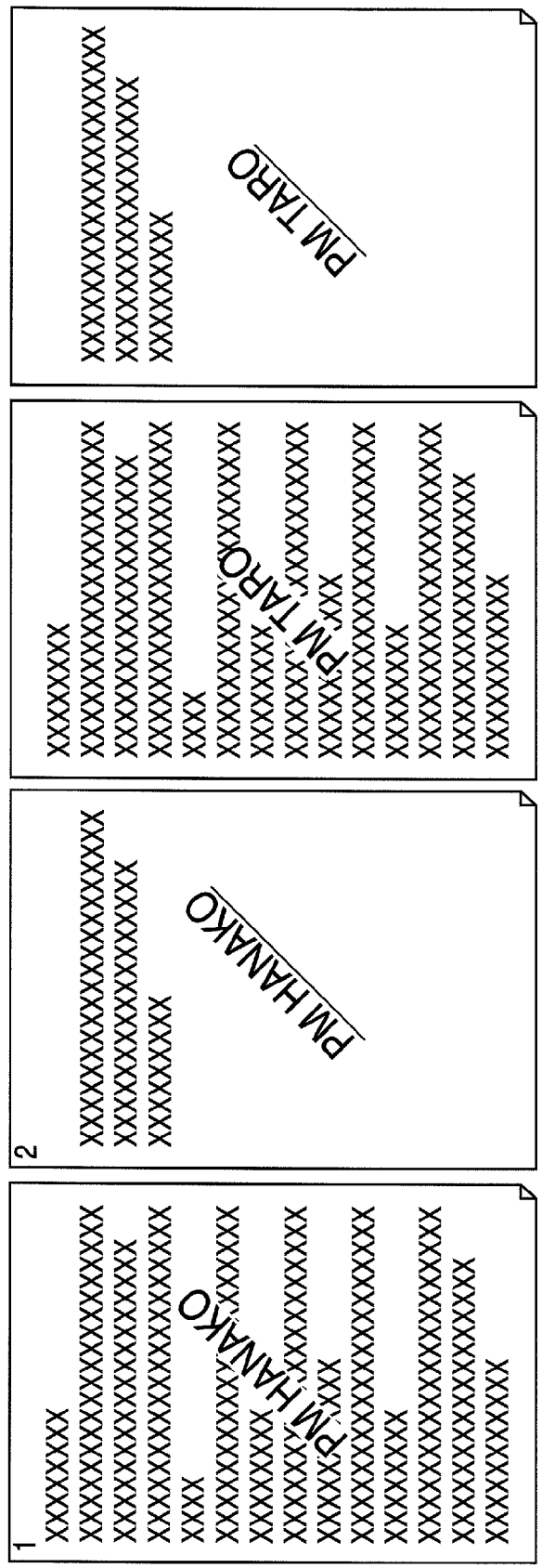
FIG. 17 is a diagram illustrating print results of using the stamp affixing function for a plurality of arbitrary character strings.

FIG. 16 illustrates the results of registering, designating, and printing a stamp in the above described manner, where "PM Hanako" is selected and printed as the stamp. By repeating similar operations, print results of using the stamp affixing function for a plurality of arbitrary character strings may be obtained as illustrated in FIG. 17. To obtain different print results, different registered stamps and repeat printing is performed.

Figure 18:
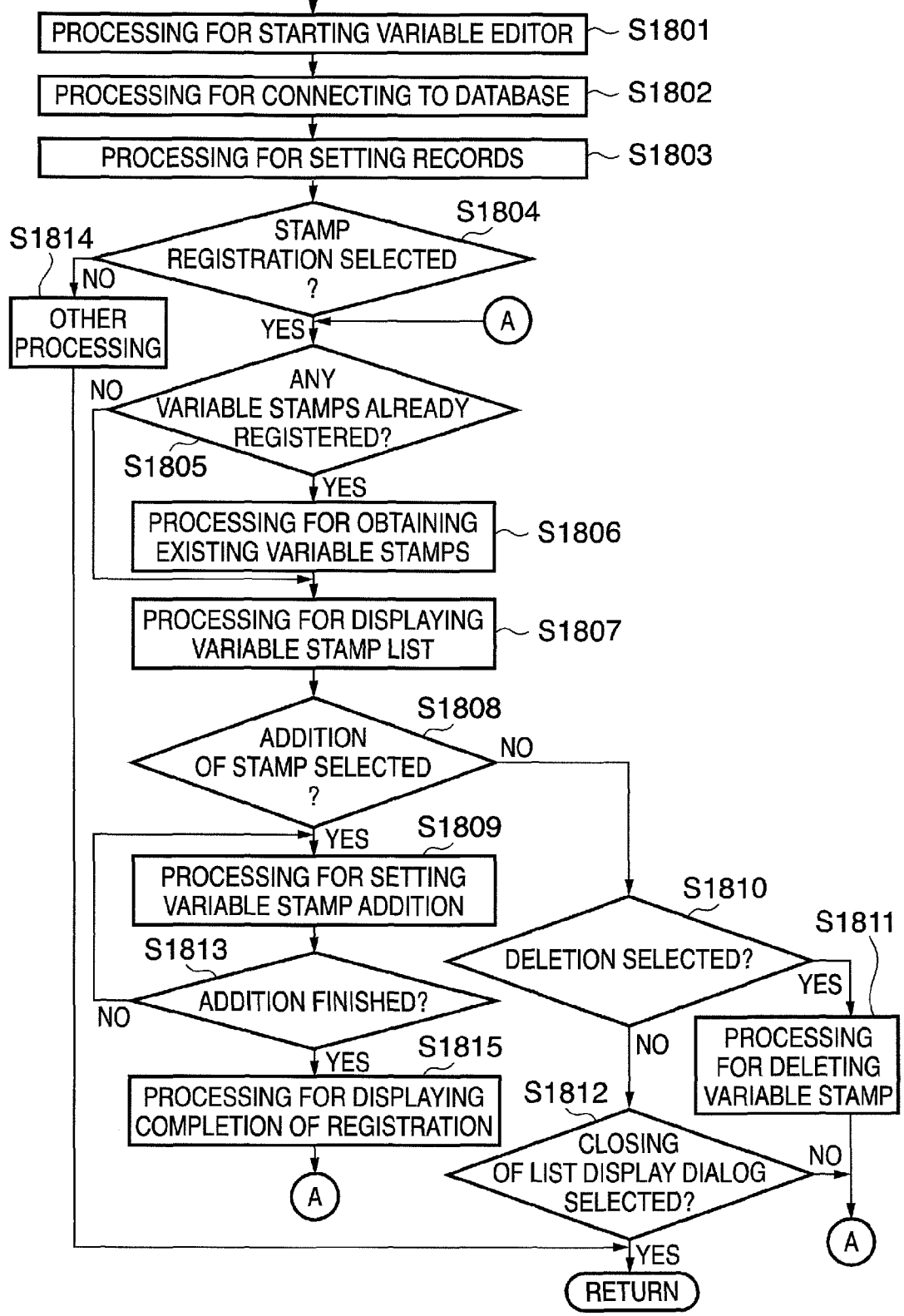
FIG. 18 is a flowchart illustrating processing for registering or deleting a variable stamp in the embodiment.
Figure 19:
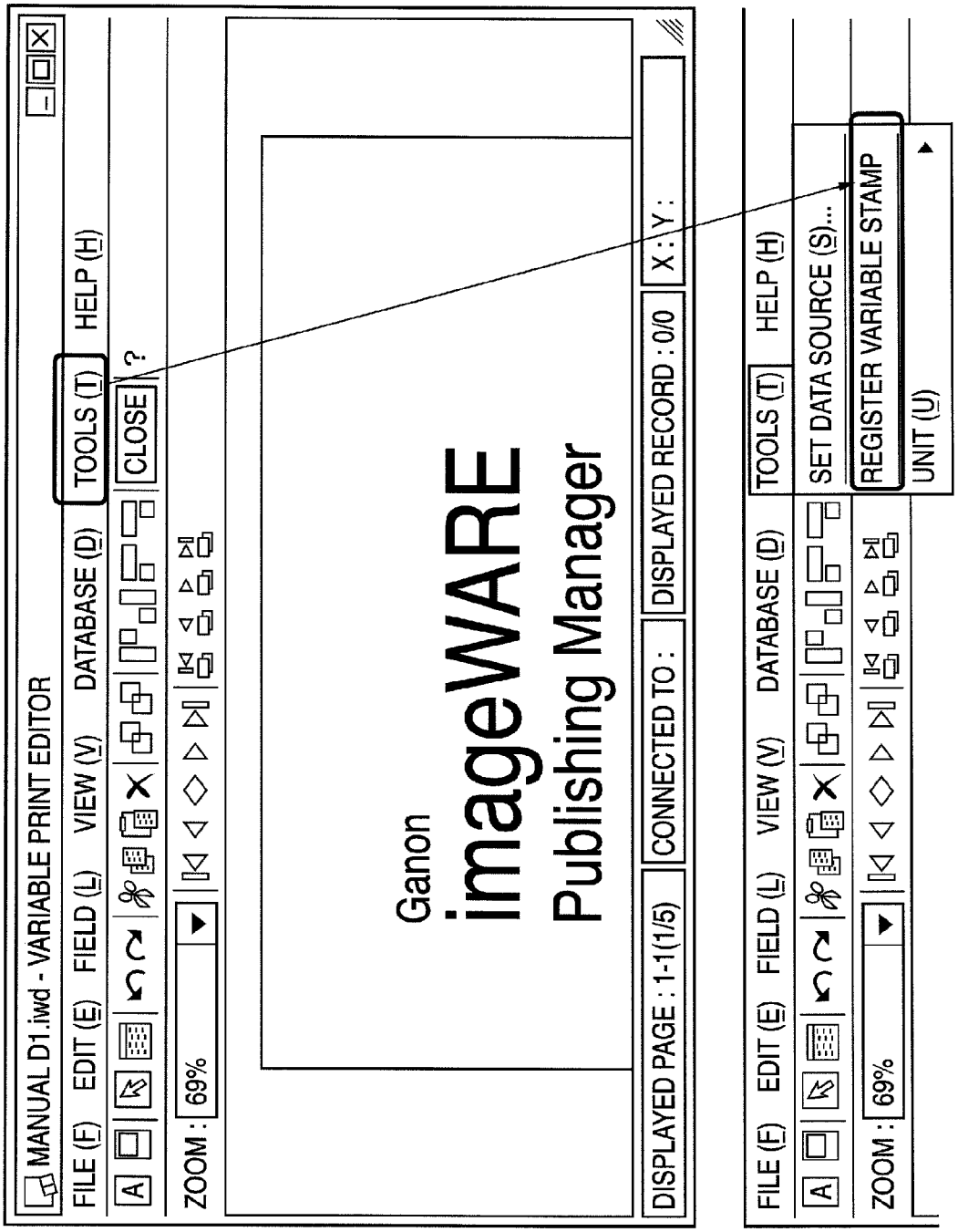
FIG. 19 is a diagram illustrating an exemplary variable editor for defining variable fields.

FIG. 18 is a flowchart illustrating the processing for registering or deleting a variable stamp in present embodiment. When a user is going to register a variable stamp, the user opens "Tool" on the menu on the UI screen of the bookbinding application illustrated in FIG. 10 and selects the item "Variable Editor." On receiving this selection, in step S1801, the bookbinding application 104 performs processing for starting a variable editor. The variable editor is an editor for defining variable fields when variable printing is desired. FIG. 19 illustrates the variable editor started by this processing.

In step S1802, the variable editor selects a database file designated by a user operation and performs processing for connecting to a database file. Generally, when variable printing is performed, a connection is made to a database and data is obtained from the database to perform printing by affixing the data to original data. In this case a connection to the database is also created so that a file serving as the database is selected from a "Database" control on the menu illustrated in FIG. 19. The structure of the connected database may be of any type that would allow practice of the present invention. That is, the database file for the variable stamp information as used in the present embodiment refers to a variable-information file defining variable data for a plurality of records.

In step S1803, the variable editor performs processing for setting records. This is processing for setting the details of records in the connected database file, such as reordering the records. This processing is performed according to the user's selection. Specifically, the data in the database file selected in step S1802 is analyzed. For example, if the database file were in a Microsoft® Excel format, columns in the first row are representative items and each row from the second row onward is treated as one record. The columns are displayed as values of respective items so that the user may be prompted to confirm the correspondence.

In step S1804, the variable editor determines whether stamp registration is selected. This is processing for determining whether the user selects "Tool"—"Register Variable Stamp" as illustrated in FIG. 19 in an attempt to register a stamp. It is assumed here that the user desires the registration of a variable stamp based on the database just connected and selects the registration. If the registration is not selected, other processing is performed in step S1814 and this processing terminates.

If the registration is selected, the variable editor determines in step S1805 whether any variable stamps are already registered. This is processing for determining whether registered variable stamps exist by a sequence described below. It is assumed here that registered variable stamps exist. Two registration locations can be conceived, i.e., the host (e.g., a personal computer) if a stamp is registered as host-specific stamps, or an electronic document file if a stamp is registered as data-specific stamps. The registration may be in any form. If a stamp is registered on the host, the electronic document file maintains as information the location (path) where the database file is stored on the host, and the record setting of the database is maintained. If a stamp is registered in an electronic document file, the connected database file is loaded into the electronic document file, and the record setting of the database is also maintained.

Loading the database file into the electronic document file allows the variable stamp information to be used even if the electronic document file itself is transferred to another PC. If the stamp is registered on the host, the variable stamp information can be used on that host PC, and the data size of the electronic document file itself can also be reduced. However, if the stamp is registered on the host, the variable stamp information cannot be used when it is transferred to another PC or when the connected database file is deleted.

According to the above-described determination result, the variable editor performs processing for obtaining the existing variable stamps in step S1806. This is processing for obtaining the variable stamps already registered. It is assumed here that three variable stamps are already registered, and "Variable Stamp_Text", "Variable Stamp_Image", and "Variable Stamp" are obtained.

In step S1807, the variable editor performs processing for displaying a variable stamp list. This is processing for displaying a list of the existing variable stamps just obtained. As described above, the three variable stamps have been obtained in this example, and these are displayed in a list as illustrated in FIG. 20.

Figure 20:
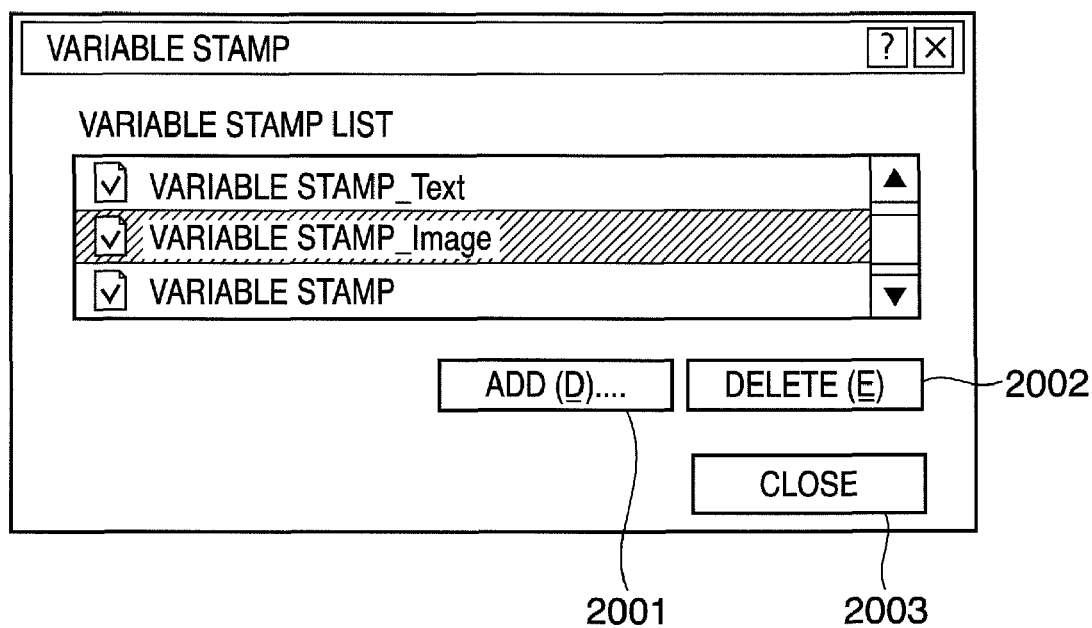
FIG. 20 is a diagram illustrating an exemplary list display of variable stamps.

In step S1808, it is determined whether the user desires a new variable stamp on the list display screen illustrated in FIG. 20. If the user is going to add a new variable stamp, "Add" 2001 in FIG. 20 is selected. A plurality of variable stamps may be registered, and once the variable stamps are registered, they are added to the list display.

Figure 21:
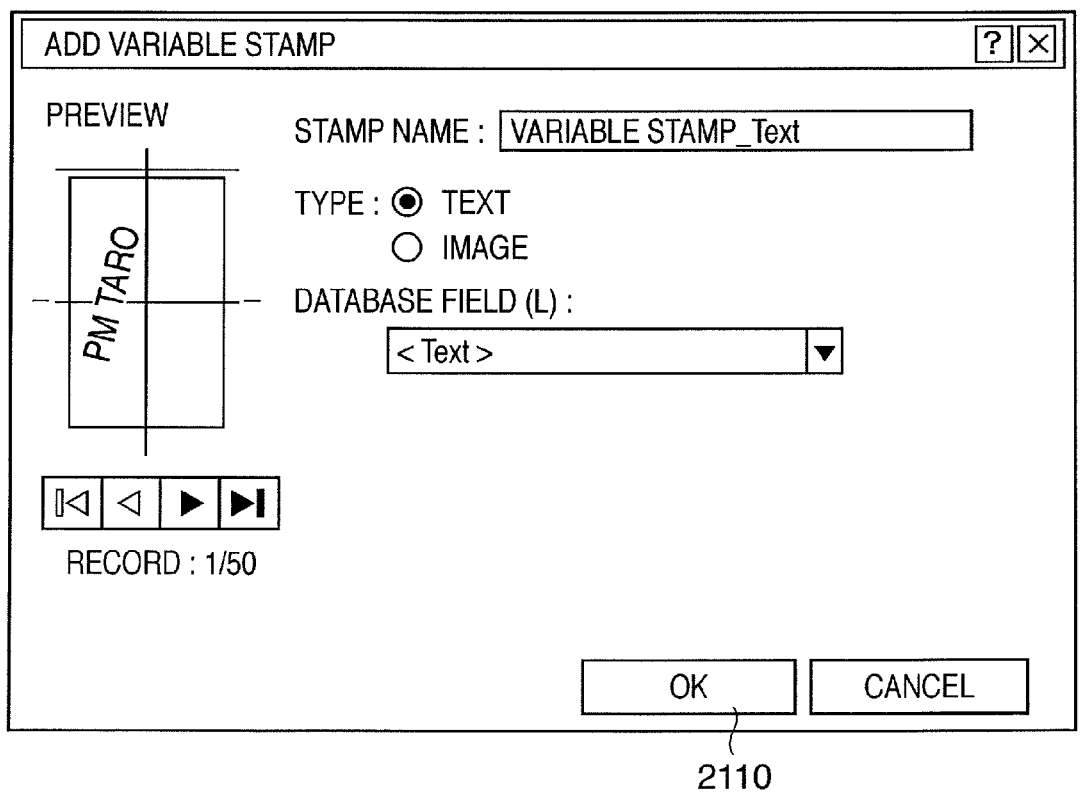
FIG. 21 is a diagram illustrating an exemplary setting dialog for prompting a user to enter detailed settings when addition of a variable stamp is set.

If registration is selected, the variable editor performs processing for setting the addition of a variable stamp in step S1809. This is processing for displaying a setting dialog for prompting the user to enter detailed settings when a variable stamp is going to be added, as illustrated in FIG. 21. FIG. 22 illustrates the details of each control. In the setting dialog in FIG. 21, the user may use a pull down menu at (3) to select which database field (i.e., item) in the database file to register as the variable stamp information. The pull down menu at (3) displays items in the first record, or the representative items, read by the variable editor from the database file. Therefore, even though the database file has a plurality of items in each record, one piece of variable information to be registered as the variable stamp information may be selected from the database file and may be set.

Figure 23:
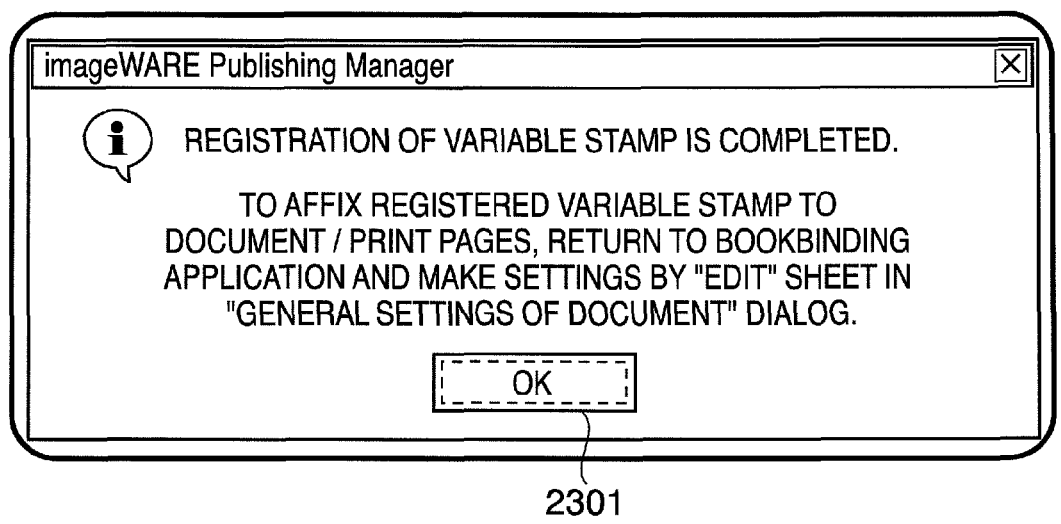
FIG. 23 is a diagram illustrating an exemplary message for informing the completion of variable stamp registration.

Next, in step S1813, the variable editor determines whether the addition has been finished. Here, if a control "OK" 2110 is selected, the variable editor performs processing for displaying the completion of registration in step S1815. The variable editor informs the bookbinding application 104 of the details of the registration and stores the registration information about the variable stamp set in FIG. 21 in the electronic document file. This is processing for informing the user that the registration has been completed according to the details set in step S1809, as illustrated in FIG. 23. It is indicated here that only the registration of the stamp has been finished and settings for actual rendering must be made in the client. If a control "OK" 2301 is selected, the stamp is listed in the list display of variable stamps illustrated in FIG. 20, so that the registration can be confirmed.

If addition of a stamp is not selected in step S1808, the variable editor determines in step S1810 whether deletion is selected. This is processing for determining whether a control "Delete" 2002 for deletion from the registered variable stamps in the list display illustrated in FIG. 20 is selected. If the control "Delete" 2002 is selected, the process proceeds to step S1811 to delete a variable stamp listed in the list display.

If the "Delete" 2002 is not selected in step S1810, the process proceeds to step S1812, where the variable editor determines whether "Close" 2003 is selected. If the "Close" 2003 is not selected, the process returns to step S1805 to repeat the above-described processing. If "Close" 2003 is selected, the processing terminates.

Figure 24:
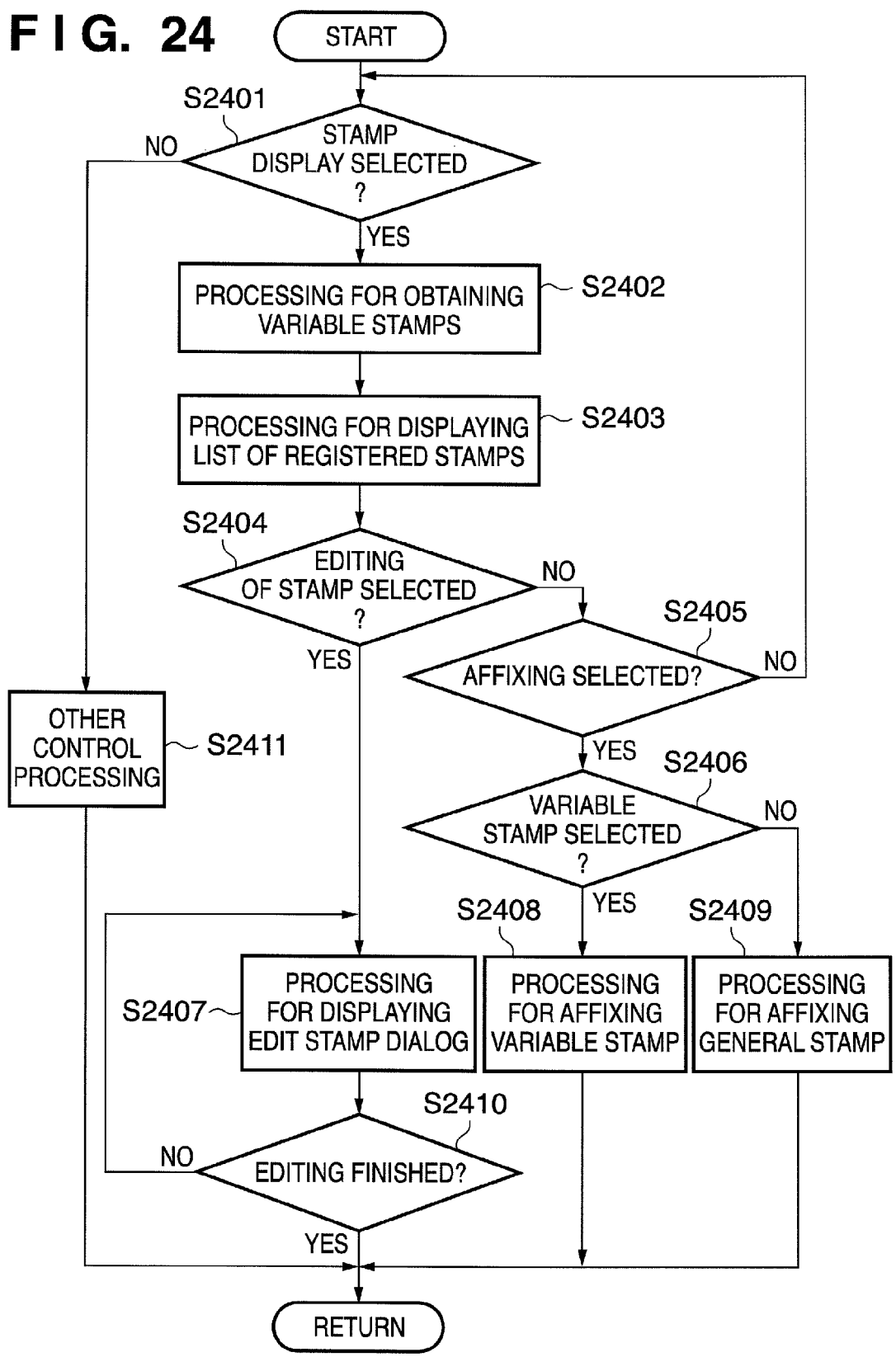
FIG. 24 is a flowchart illustrating processing for affixing or editing a variable stamp.

FIG. 24 is a flowchart illustrating the processing for affixing or editing a variable stamp in present embodiment. First, in step S2401, the bookbinding application 104 determines whether stamp display is selected. This is processing for determining whether or not displaying of the stamp affixing UI illustrated in FIG. 14 is selected for affixing or editing a stamp on the UI screen of the bookbinding application illustrated in FIG. 10.

If displaying is selected, and before listing the stamps, the bookbinding application 104 performs processing for obtaining variable stamps in step 2402. This is processing for obtaining registered variable stamps in addition to existing general stamps. It is assumed here that variable stamps have been registered with the above-described sequence of processing and "Variable Stamp_Text", "Variable Stamp_Image", and "Variable Stamp" are obtained. The registration information about the variable stamps that has been set in FIG. 21 is contained in the electronic document file.

Figure 25:
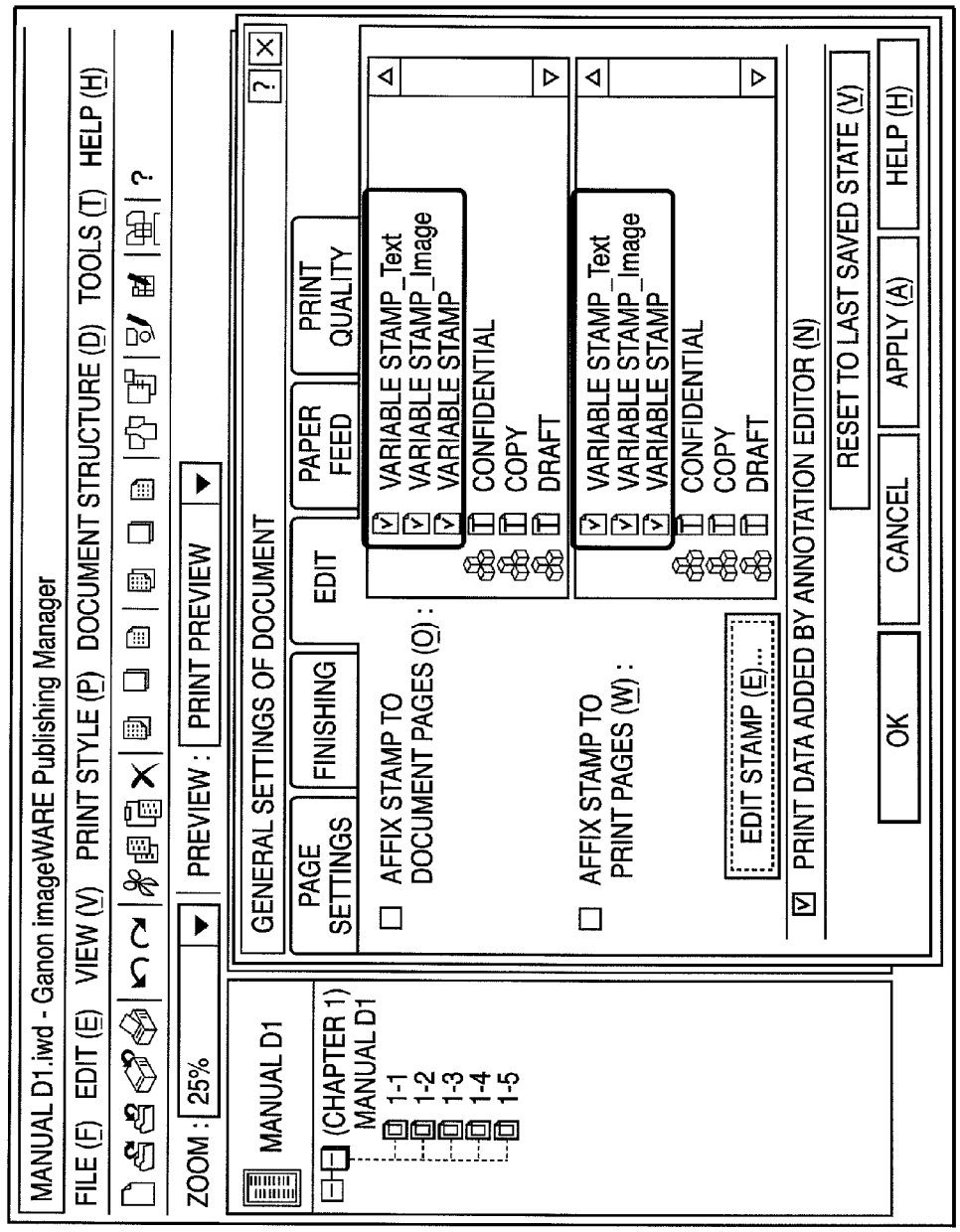
FIG. 25 is a diagram illustrating an exemplary list display of registered stamps and registered variable stamps.

Once the variable stamps are obtained, the bookbinding application 104 performs processing for displaying a list of the registered stamps in step S2403. This is processing for displaying a list of registered stamps including the variable stamps just obtained. As described above, the three variable stamps have been obtained as registered stamps, so that these registered variable stamps are listed together with the general stamps, as illustrated in FIG. 25. In the present embodiment, an identification icon is displayed beside each name of the fixed stamp information so that the user can distinguish between the variable stamp information, i.e., the variable stamps, and the fixed stamp information. An identification icon may also be displayed beside each name of the variable stamp information.

Figure 26:
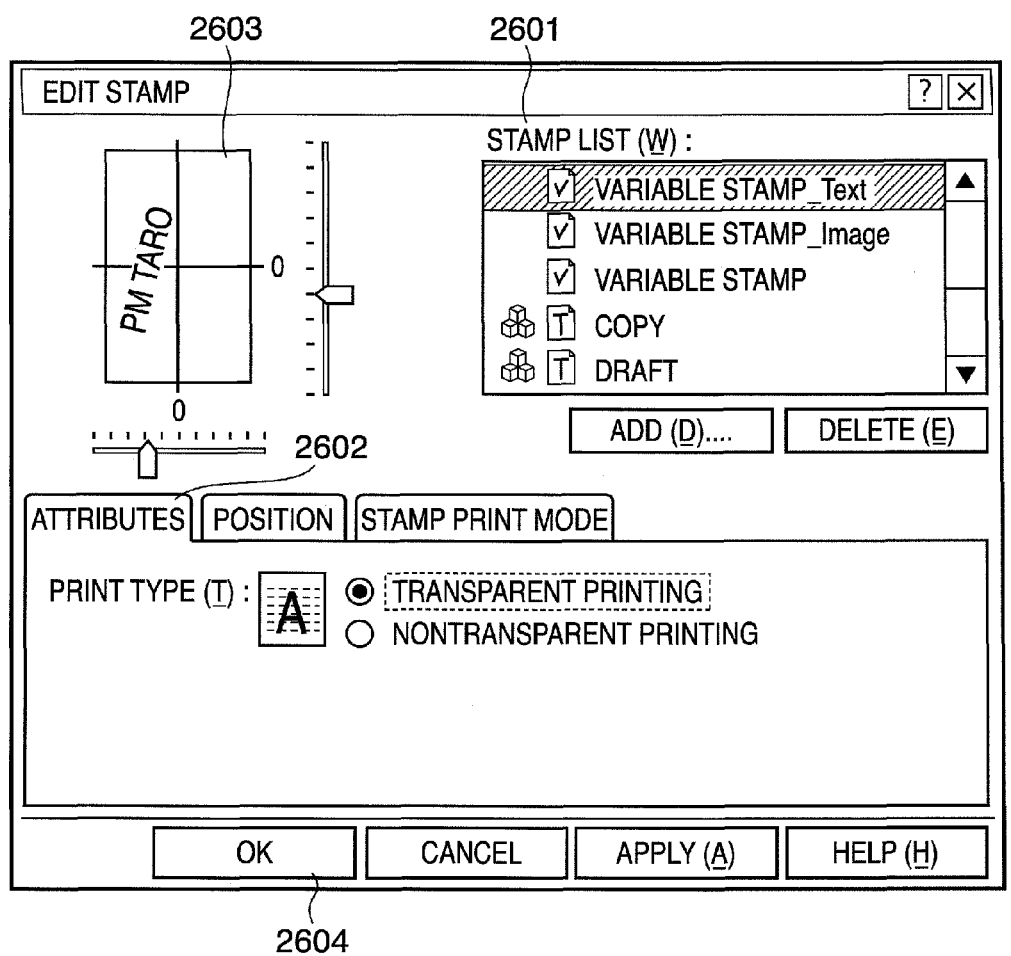
FIG. 26 is a diagram illustrating an exemplary stamp editing UI screen.

In step S2404, it is determined whether editing of a stamp is selected. This is processing for determining whether "Edit Stamp" is selected on the UI illustrated in FIG. 25. If editing is selected, a dialog for editing stamps is displayed by processing for displaying the stamp editing dialog in step S2407, as illustrated in FIG. 26. A variable stamp to be edited may be selected from a stamp list 2601, and detailed settings may be made with tabs 2602 for the attributes, position, and stamp print mode. Since the registration performed in FIGS. 20 and 21 is for the data content of the variable stamp, this registration processing provides default values for the size, position, and print type, which will be set in FIGS. 26 and 27A to 27C.

FIGS. 27A to 27C are diagrams illustrating an example in which the attributes, position, and print mode of the stamp are set in the stamp editing dialog. As illustrated in FIGS. 26 and 27A, the position and print mode for the variable stamp may be set in a manner similar to a general stamp. The detailed settings in the attribute tab vary depending on whether the type of the selected stamp is text (see FIG. 27B) or an image (see FIG. 27C).

If the variable stamp information and the fixed stamp information are text, the attribute tab illustrated in FIG. 27B may be used to set the content of the character string, font type, style, size, and color. If the fixed stamp information to be affixed is an image, the attribute tab illustrated in FIG. 27C may be used to designate the path to the image file and to set the scaling. If the variable stamp is selected, the first record is obtained and displayed on a preview screen 2603 illustrated in FIG. 26.

Turning back to FIG. 24, in step S2410, the bookbinding application 104 determines whether the editing is finished. If a control "OK" 2604 is selected, the editing is reflected and the display returns to the stamp affixing dialog illustrated in FIG. 25.

If editing of a stamp is not selected in step S2404, the process proceeds to step S2405 to determine whether affixing is selected. This is processing for determining whether "Affix Stamp to Document Pages" or "Affix Stamp to Print Pages" is selected on the UI illustrated in FIG. 25. "Affix Stamp to Print Pages" means processing for affixing a stamp to printing paper and may be selected together with the former "Affix Stamp to Document Pages."

If "Affix Stamp to Document Pages" is selected, then in step S2406, the bookbinding application 104 determines whether a variable stamp is selected. This is processing for determining whether the stamp selected from among the stamps listed in FIG. 25 is a variable stamp. If a variable stamp is selected, the process proceeds to step S2408 to perform processing for affixing the variable stamp. This is processing for storing the information about the variable stamp as flags in order to affix the variable stamp to selected document pages or print pages. If the selected stamp is not a variable stamp, the process proceeds to step S2409 to perform processing for affixing a general stamp. Next, pressing an "OK" control on the UI illustrated in FIG. 25 causes the information to be actually passed to the application itself.

Figure 28:
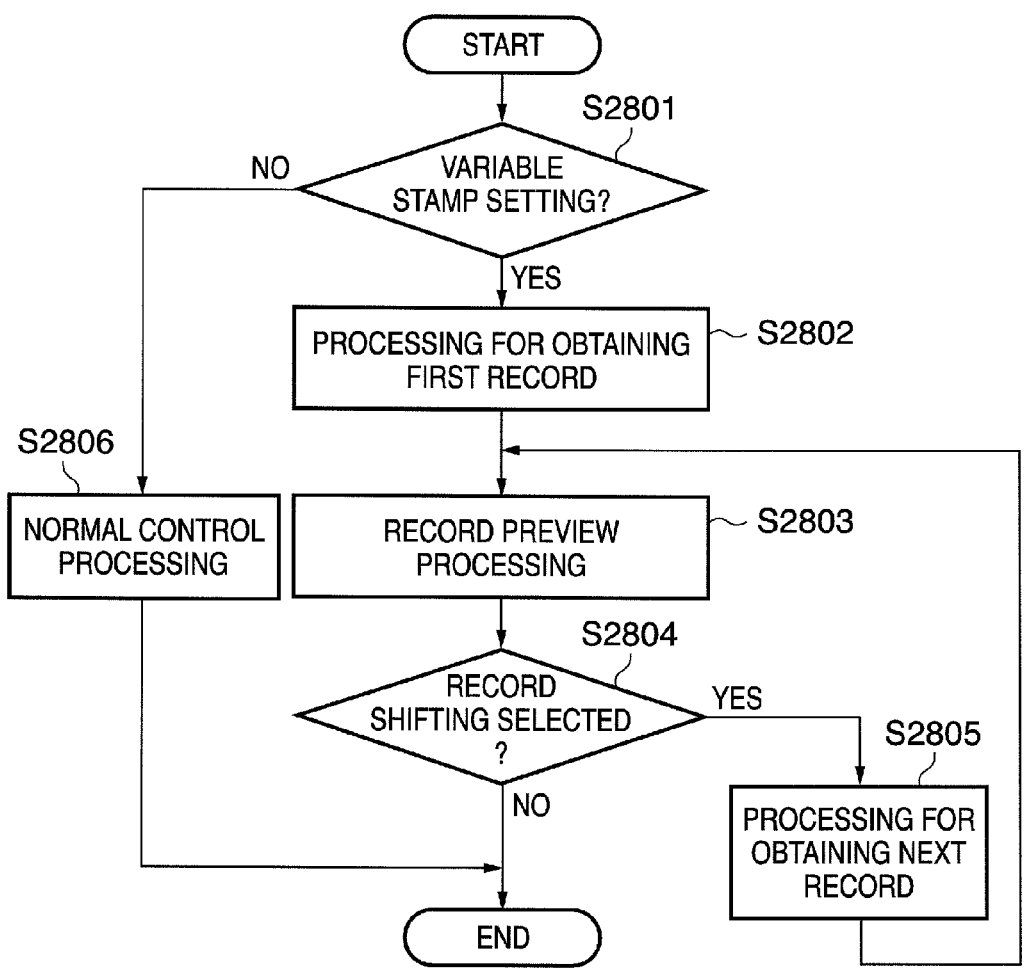
FIG. 28 is a flowchart illustrating display processing of a bookbinding application.

FIG. 28 is a flowchart illustrating the display processing of the bookbinding application 104 in the present embodiment. It is assumed here that a variable stamp has been selected and "Affix Stamp to Document Pages" has been set on the above-described variable stamp affixing UI.

First, in step S2801, the bookbinding application 104 determines whether the variable stamp setting has been made. If the variable stamp setting has been made, then in step S2802, processing for obtaining the first record is performed. This is processing for obtaining the first record of the selected variable stamp. Since the records themselves have been obtained and stored in a memory table in the electronic document file when a connection was made to the database in the preceding registration, the first record is obtained from the memory table. While the memory table is used here by way of example, the records may be stored in and obtained from any locations, including an external file.

Figure 29:
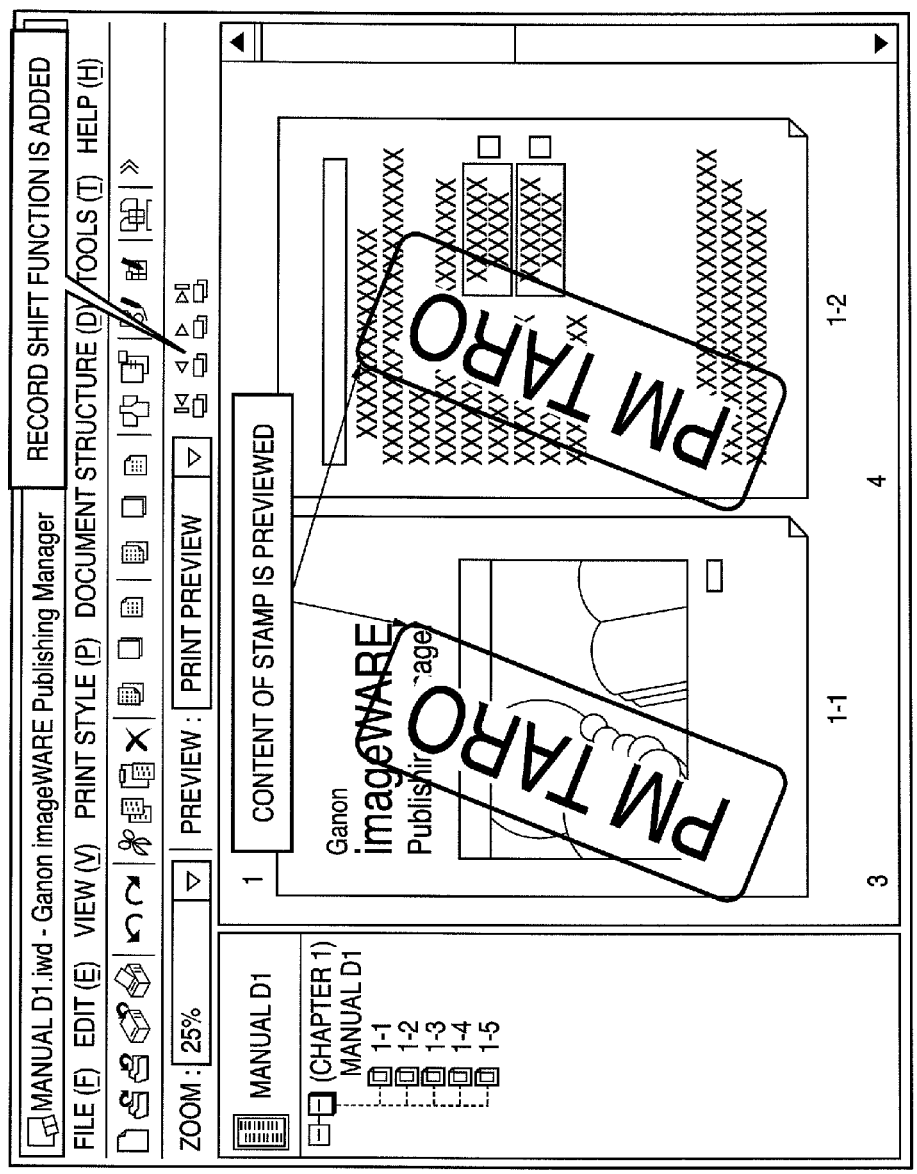
FIG. 29 is a diagram illustrating that the first record is displayed by record preview processing.

In step S2803, the bookbinding application 104 performs record preview processing. This is processing for displaying the first record just obtained and the document together on the bookbinding application 104. In this example, it is assumed that "PM Taro" has been obtained as the first record in step S2802, as illustrated in FIG. 29 As illustrated in FIG. 29, the document data is displayed with T"PM Taro" affixed as a stamp thereto.

In step S2804, the bookbinding application 104 determines whether shifting of the record is selected. This is processing for determining whether the user desires a preview of the next record and selects a record shift control illustrated in FIG. 29.

If the user desires a preview of the next record, then in step S2805, the bookbinding application 104 performs processing for obtaining the next record. This is processing for obtaining the next record with processing similar to obtaining the first record (step S2802). It is assumed here that "iw Hanako" is obtained as the next record of this variable stamp.

Next, the process returns to the record preview processing (step S2803) to provide a preview incorporating the next record "iw Hanako." FIG. 30 illustrates the display associated with the preview. As illustrated in FIG. 30, the document data is displayed with "iw Hanako" affixed as a stamp thereto.

According to the above described processing, on the bookbinding application 104 itself, the document with the variable stamp affixed thereto can be previewed and the record can be shifted. Thus, the display processing of the bookbinding application 104 involving a variable stamp has been described in the flowchart illustrated in FIG. 28. The processing may be modified as follows to implement print processing.

First, step S2803 is performed by replacing the "record preview processing" with "record print processing." In the record print processing, the bookbinding application 104 obtains data on each page in the electronic document file and uses the electronic document despooler 105 to output rendering data to the printer driver 106 via a graphic engine (not shown) of the OS. At this point, as the rendering data, the bookbinding application 104 outputs the variable stamp information obtained in step S2802, i.e., data on the target record in the database file, according to the attributes of the size, position, and print mode that have been set in FIGS. 26 and 27.

Next, step S2804 is performed by replacing "record shifting selected?" with "print the next record?" That is, the bookbinding application 104 determines whether to print the record next to the one printed in step S2803. In printing with the variable stamp information, the user may designate the number of records to be printed on the print setting screen, such as the first to third records. If the bookbinding application 104 determines to print the next record, the process proceeds to step S2805. Other steps are similar to the processing shown in FIG. 28.

The printer driver 106 that has received the rendering data converts the rendering data into print data interpretable by the printer and generates a print job, which is sent to the printer. In this manner, the bookbinding application 104 can implement the print data generation processing using the variable stamp information as the variable stamp.

According to the present embodiment, it is possible to connect to the database containing a plurality of registered character strings and apply their field definitions to a stamp, so that the stamp function using this variable data (variable) can be used on the system. Therefore, a plurality of desired character strings can be affixed without the need of individually registering each character string.

Also at the time of printing, a plurality of desired stamp results can be obtained by designating the range of records to be printed.

Furthermore, these abilities provide a significant improvement in the operability compared to the case where text field definitions of the conventional variable function of the system are used.

Further Embodiment

FIGS. 31 to 34 illustrate still yet another embodiment of the present invention. From the standpoint of copy protection, the present embodiment includes automatically adjusting the stamp position so that a variable stamp overlaps document data as much as possible. The configuration of the print system in the present embodiment is similar to the configurations described above. As such, a detailed description is omitted herein.

Figure 31:
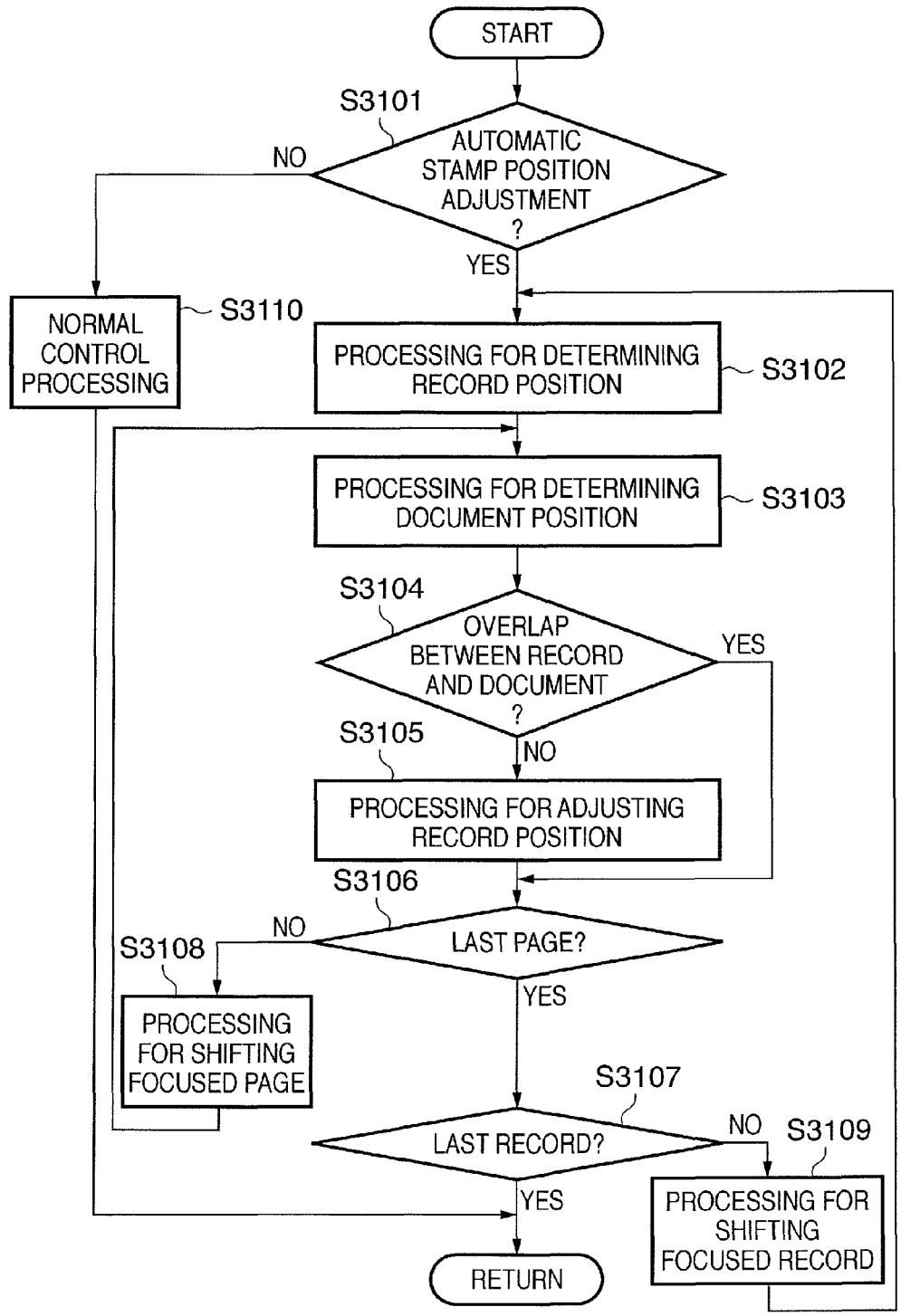
FIG. 31 is a flowchart illustrating processing for automatically adjusting the stamp position.

FIG. 31 is a flowchart illustrating processing for automatically adjusting the stamp position in the present embodiment. First, in step S3101, it is determined whether to perform automatic stamp position adjustment. This is processing for determining whether to perform the automatic adjustment of the position of the variable stamp. As on a UI illustrated in FIG. 32, it is determined whether a checkbox of a control "Automatic Position Adjustment" 3201 is marked on the stamp affixing UI.

Figure 33:
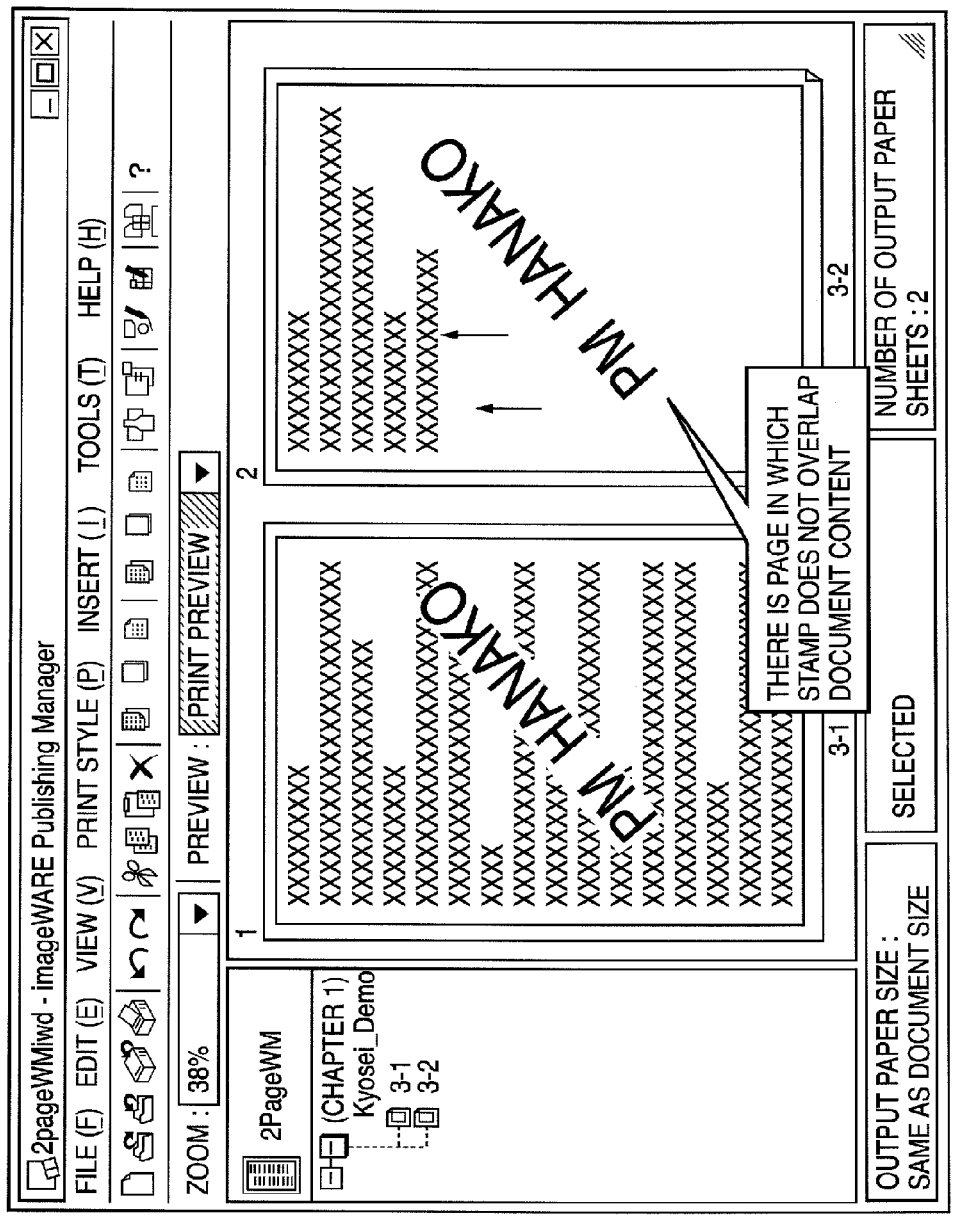
FIG. 33 is a diagram illustrating an exemplary page in which a variable stamp does not overlap a document.

If automatic stamp position adjustment is to be performed, the process proceeds to step S3102 to perform processing for determining the record position. This is processing for computing the position of the characters based on the position of the record designated on the stamp editing UI illustrated in FIG. 26, and based on the record obtained in the preceding processing for obtaining the first record (step S2802). As illustrated in FIG. 33, it is assumed here that "PM Hanako" has been obtained as the first record of the variable stamp, and its position is as shown in the figure.

In step S3103, processing for determining the document position is performed. This is processing for computing the position of character strings contained in the document to which the stamp is affixed. Although this processing will be performed for all pages by subsequent processing, at this point, the position of the character strings on the document is displayed for the first page as illustrated in FIG. 33.

In step S3104, it is determined whether there is an overlap between the record and the document. This is processing for determining whether the position of the stamp character string of the record obtained earlier overlaps the position of the character strings and so on contained in the document. Since the record and the document illustrated in FIG. 33 are assumed here, it is determined that there is an overlap.

Next, in step S3106, it is determined whether the last page of the document is reached by determining whether the current page is the last page. Since the document illustrated in FIG. 33 is assumed here, it is determined that the current page is not the last page. Thus, in step S3108, processing for shifting the focused page is performed. This is processing for shifting the focus to the next page, i.e., the second page in this case.

The process then returns to step S3103, where the processing for determining the document position is performed to compute the position of character strings contained in the second page of the document. This time, the document position for the second page illustrated in FIG. 33 is computed. There is no change in the record position, and again in step S3104, processing for determining whether there is an overlap between the record and the document is performed to detect an overlap.

Figure 32:
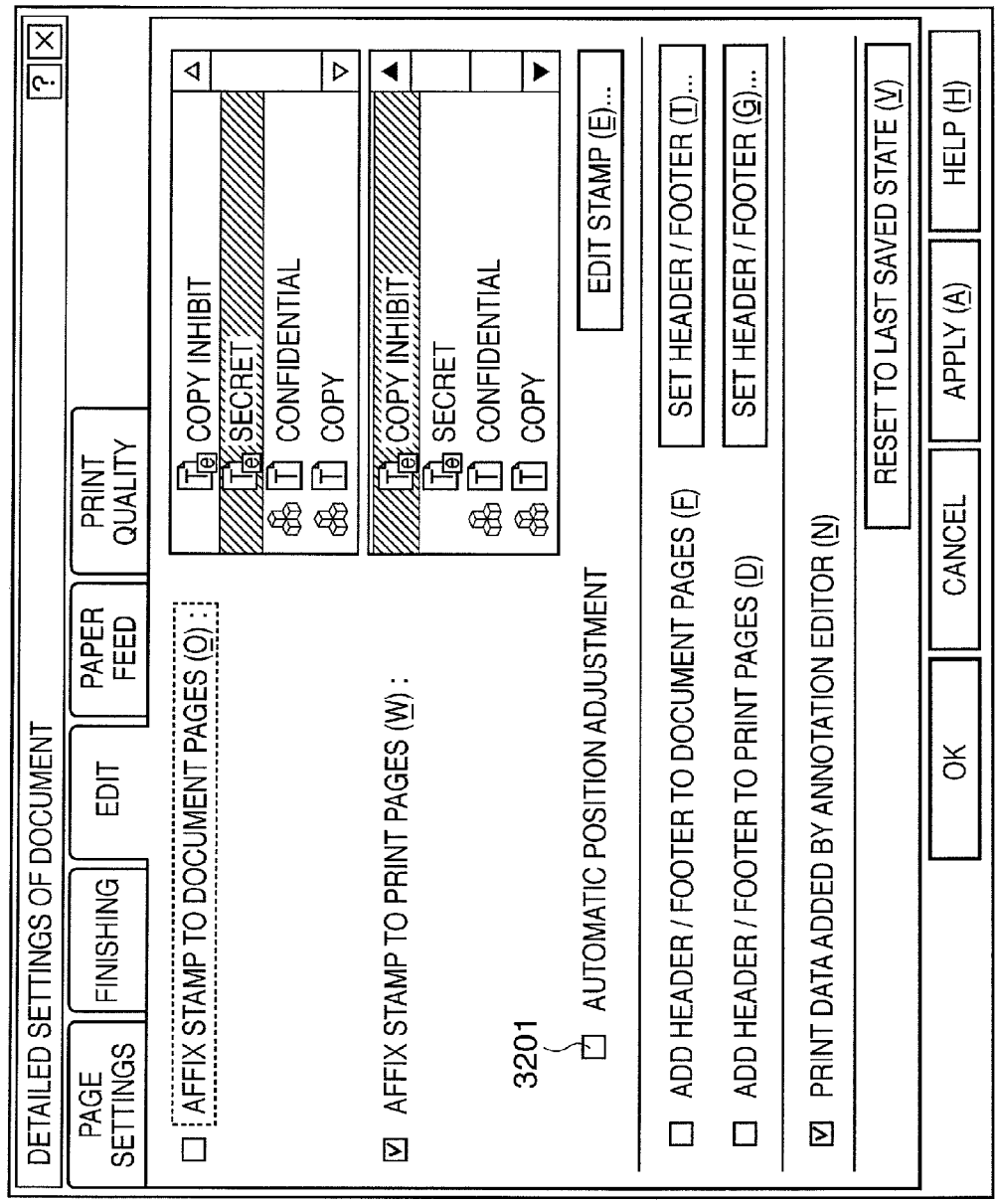
FIG. 32 is a diagram illustrating a UI screen indicating automatic adjustment of the variable stamp position.

If, as on the UI illustrated in FIG. 32, the checkbox of the control "Automatic Position Adjustment" is not marked on the stamp affixing UI, a normal stamp preview is displayed as the preview of the second page in FIG. 33. However, in the present case, the process proceeds to step S3105 to perform processing for adjusting the record position. This is processing for translating the position of the variable stamp so that the variable stamp overlaps the document content if there is no overlap between the variable stamp and the document. The position is translated in the direction requiring the minimum moving amount.

Figure 34:
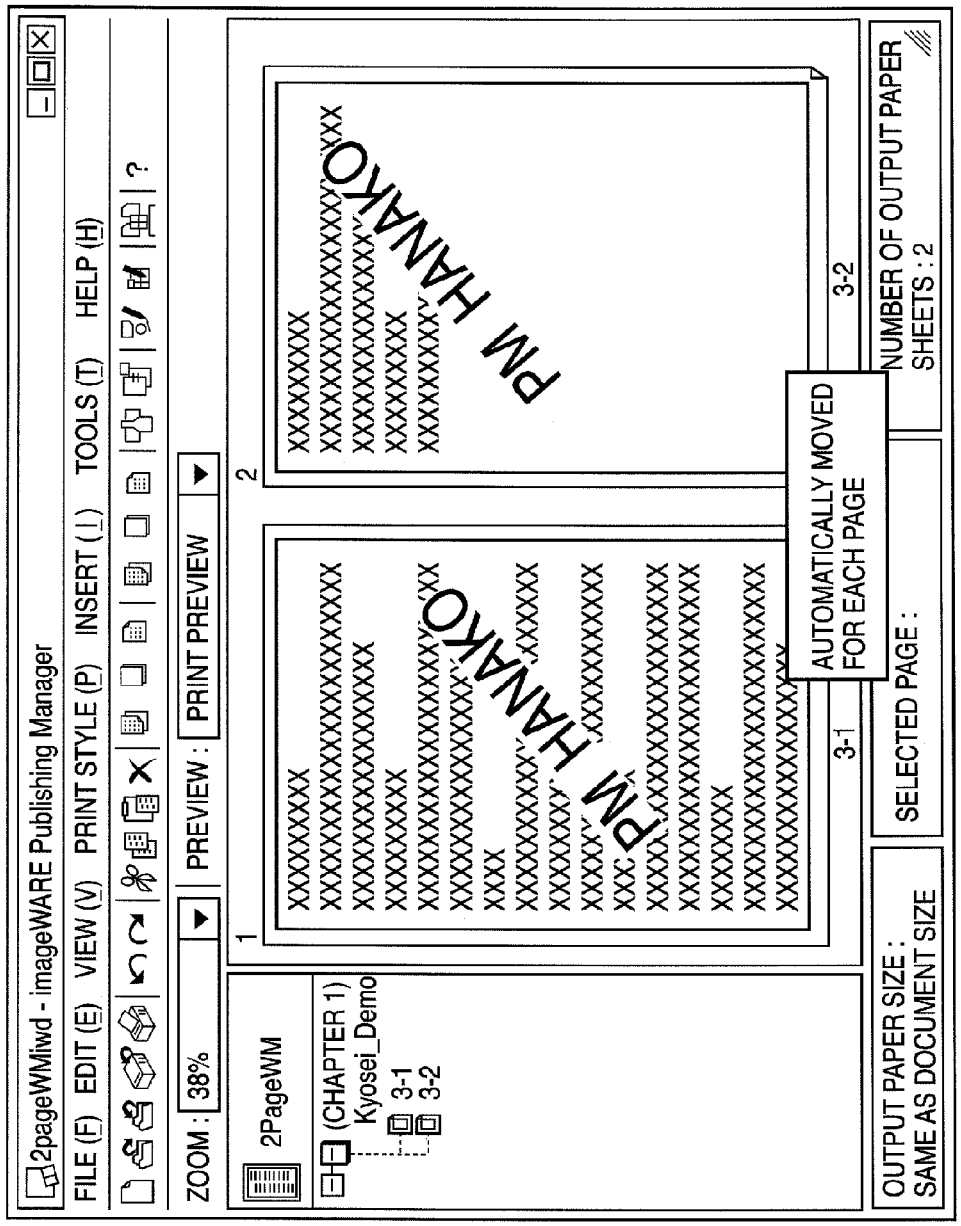
FIG. 34 is a diagram illustrating the result of processing for automatically moving the variable stamp for each page.

The above-described processing is performed for all document pages and further for all records (S3107 and S3109). As a result, as illustrated in FIG. 34, the variable stamp can be affixed to all pages in such a manner that it always overlaps the document content.

In the above-described embodiments, the records are obtained and stored in advance in an internal memory table or the external file at the time of registration. Alternatively, the records may be obtained as needed. For example, the first record may be obtained from the database in the processing for obtaining the first record (step S2802), and the next record may be obtained in the processing for obtaining the next record (step S2805).

According to the present embodiment, the position of the stamp using the variable data (variable) is translated for each record or page in order to cause the stamp to overlap the document content. This can increase the effect of copy protection.

The present invention may be applied to a system composed of a plurality of devices (e.g., a host computer, an interface device, a reader, and a printer) or to an apparatus implemented as a single device (e.g., a copier or a facsimile machine).

It is to be understood that the objects of the present invention are achieved in such a manner that a recording medium storing program code of software for implementing the functions of the above-described embodiments is supplied to the system or apparatus, and a computer (CPU or MPU) in the system or apparatus reads out and executes the program code stored in the recording medium.

In this case, the program code itself read out from the recording medium implements the functions of the above-described embodiments, and the recording medium storing the program code constitutes the present invention.

Examples of the recording medium that may be used for providing the program code include a floppy disk, hard disk, optical disk, magneto-optical disk, CD-ROM, CD-R, magnetic tape, nonvolatile memory card, and ROM.

It is to be understood that the present invention covers the case where the computer executes the read-out program code to implement the functions of the above-described embodiments, as well as the case where an OS (Operating System) or the like running on the computer performs part or all of actual processing under instructions of the program code to implement the functions of the above-described embodiments.

It is further to be understood that the present invention covers the case where after the program code read out from the recording medium is written to memory provided in a function extension board inserted into the computer or in a function extension unit connected to the computer, a CPU or the like provided in the function extension board or function extension unit performs part or all of actual processing under instructions of the program code to implement the functions of the above-described embodiments.

According to the above described embodiments, by using the stamp function to register variable character strings or images as the variable stamp information in a database, a printed document with the variable information affixed thereto can be readily obtained with the operability similar to normal stamp printing.

While the present invention has been described according to its preferred embodiments, the present invention is not limited to the described embodiments but various modifications may be made thereto within the scope set forth in the claims.

This application claims the benefit of Japanese Patent Application No. 2006-106624, filed on Apr. 7, 2006, which is hereby incorporated by reference herein in its entirety.

What is claimed is:

1. A method in an information processing apparatus that has a function to affix variable additional information to a page, the method comprising:
  selecting a database file including a plurality of records, each of the plurality of records being comprised of a plurality of items;
  displaying representative items in the selected database file;
  selecting an item from the displayed representative items;
  registering a variable stamp generated based on the selected database file and the selected item;
  displaying a stamp selecting screen including the registered variable stamp and a normal stamp, wherein the registered variable stamp and the normal stamp are distinguishable from each other in the stamp selecting screen;
  affixing first data of the selected item included in a first record to the page as variable additional information if the first record is selected from the plurality of records and the variable stamp is selected in the stamp selecting screen;
  changing the first record for a second record, wherein second data of the selected item included in the second record is affixed to the page as the variable additional information if the first record is changed for the second record;
  determining whether or not the variable additional information overlaps character strings on a document; and
  changing a position of the variable additional information so that the variable additional information overlaps the character strings on the document in a case where it is determined, after a record is selected, that the variable additional information does not overlap the character strings on the document.

2. The method according to claim 1, wherein the variable additional information is selected from a list including the variable additional information and fixed additional information.

3. The method according to claim 1, wherein variable additional information edited by a user is registered.

4. The method according to claim 1, wherein each of the plurality of records is comprised of a plurality of items and one item is set as the variable additional information.

5. An information processing apparatus including a function to affix variable additional information to a page, comprising:
  a memory;
  a processor coupled to the memory, the processor configured to control at least:
  a database file selecting unit configured to select a database file including a plurality of records, each of the plurality of records being comprised of a plurality of items;
  a display unit configured to display representative items in the selected database file;
  a selecting unit configured to select an item from the representative items displayed by the displaying unit;
  a registering unit configured to register a variable stamp generated based on the selected database file and the selected item;
  a stamp selecting screen including the registered variable stamp and a normal stamp, wherein the registered variable stamp and the normal stamp are distinguishable from each other in the stamp selecting screen;
  an affixing unit configured to affix first data of the selected item included in a first record to the page as the variable additional information if the first record is selected from the plurality of records and the variable stamp is selected in the stamp selecting screen;
  a changing unit configured to change the first record for a second record,
  wherein second data of the selected item included in the second record is affixed to the page as the variable additional information if the first record is changed for the second record;
  a determining unit configured to determine whether or not the variable additional information overlaps character strings on a document; and
  a changing unit configured to change a position of the variable additional information so that the variable additional information overlaps the character strings on the document in a case where it is determined that the variable additional information does not overlap the character strings on the document.

6. The information processing apparatus according to claim 5, wherein variable additional information edited by a user is registered by a registration unit.

7. The information processing apparatus according to claim 5, wherein the variable additional information is selected from a list including the variable additional information and fixed additional information.

8. The information processing apparatus according to claim 5, wherein each of the plurality of records is comprised of a plurality of items and one item is set as the variable additional information.

9. A non-transitory computer-readable storage medium that stores a computer-readable program for causing a computer to execute a method in an information processing apparatus that has a function to affix variable additional information to a page, the method comprising:

selecting a database file including a plurality of records, each of the plurality of records being comprised of a plurality of item;

displaying representative items in the selected database file;

selecting an item from the displayed representative items;

registering a variable stamp generated based on the selected database file and the selected item;

displaying a stamp selecting screen including the registered variable stamp and a normal stamp, wherein the registered variable stamp and the normal stamp are distinguishable from each other in the stamp selecting screen;

affixing first data of the selected item included in a first record to the page as variable additional information if the first record is selected from the plurality of records and the variable stamp is selected in the stamp selecting screen;

changing the first record for a second record, wherein, second data of the selected item included in the second record is affixed to the page as the variable additional information if the first record is changed for the second record;

determining whether or not the variable additional information overlaps character strings on a document; and changing a position of the variable additional information so that the variable additional information overlaps the character strings on the document in a case where it is determined, after a record is selected, that the variable additional information does not overlap the character strings on the document.

* * * * *